US010070464B2

(12) United States Patent
Tang et al.

(10) Patent No.: US 10,070,464 B2
(45) Date of Patent: Sep. 4, 2018

(54) SIGNAL TRANSMISSION METHOD, APPARATUS, COMMUNICATIONS SYSTEM, TERMINAL, AND BASE STATION

(71) Applicant: Huawei Technologies Co., Ltd., Shenzhen, Guangdong (CN)

(72) Inventors: Zhenfei Tang, Shanghai (CN); Yuanjie Li, Shanghai (CN); Zhongfeng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 14/940,625

(22) Filed: Nov. 13, 2015

(65) Prior Publication Data

US 2016/0081122 A1   Mar. 17, 2016

Related U.S. Application Data

(63) Continuation of application No. PCT/CN2013/075645, filed on May 15, 2013.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0044* (2013.01); *H04L 5/0053* (2013.01);
(Continued)

(58) Field of Classification Search
CPC ............. H04W 72/04; H04W 74/0833; H04W 72/0413; H04L 1/08; H04L 5/006
See application file for complete search history.

(56) References Cited

U.S. PATENT DOCUMENTS 8,199,778 B2   6/2012  Shimomura et al.
8,855,660 B2  10/2014  Ode et al.
(Continued)

FOREIGN PATENT DOCUMENTS

CN   101902301 A   12/2010
CN   101917766 A   12/2010
(Continued)

OTHER PUBLICATIONS

"Coverage enhancement for physical channels and signals for low-cost MTC", Huawei, HiSilicon, 3GPP TSG RAN WG1 Meeting #72, Jan. 28-Feb. 1, 2013, 9 pages, R1-130017.
(Continued)

*Primary Examiner* — Anez Ebrahim

(57) ABSTRACT

The present invention provides a signal transmission method and apparatus, a communications system, a terminal, and a base station, where the method includes: determining a repetition factor or an extended sequence of a channel; determining a time domain resource according to the repetition factor or a length of the extended sequence, where the time domain resource is a transmission subframe; and sending a signal by using the transmission subframe of the channel. The signal transmission method, apparatus, communications system, terminal, and base station that are provided by the present invention can solve the technical problem of poor channel coverage in a signal transmission method in the prior art.

21 Claims, 15 Drawing Sheets

(51) Int. Cl.
*H04L 12/807* (2013.01)
*H04W 72/04* (2009.01)
*H04L 1/08* (2006.01)

(52) U.S. Cl.
CPC .......... *H04L 5/0055* (2013.01); *H04L 5/0092* (2013.01); *H04L 47/27* (2013.01); *H04W 72/0413* (2013.01); *H04W 72/0446* (2013.01); *H04L 1/08* (2013.01); *H04L 5/006* (2013.01); *H04W 72/04* (2013.01)

(56) References Cited

U.S. PATENT DOCUMENTS

| | | | |
|---|---|---|---|
| 9,025,542 | B2 | 5/2015 | Kim et al. |
| 9,350,575 | B2 | 5/2016 | Yang et al. |
| 2010/0135235 | A1* | 6/2010 | Ji .................... H04W 74/0866 370/329 |
| 2011/0085478 | A1* | 4/2011 | Zhongfeng ............ H04B 7/155 370/280 |
| 2011/0122938 | A1* | 5/2011 | Kameya ................ H04L 27/263 375/228 |
| 2011/0228863 | A1 | 9/2011 | Papasakellariou et al. |
| 2012/0026952 | A1 | 2/2012 | Okubo et al. |
| 2012/0176951 | A1 | 7/2012 | Pradas et al. |
| 2012/0307755 | A1 | 12/2012 | Kim et al. |
| 2012/0320872 | A1 | 12/2012 | Yang et al. |
| 2013/0156003 | A1 | 6/2013 | Liang et al. |
| 2013/0279430 | A1* | 10/2013 | Damnjanovic ......... H04W 8/22 370/329 |
| 2014/0219210 | A1 | 8/2014 | Lunttila et al. |

FOREIGN PATENT DOCUMENTS

| | | |
|---|---|---|
| CN | 102308653 A | 1/2012 |
| CN | 102668414 A | 9/2012 |
| JP | 2010-522471 A | 7/2010 |
| JP | 2010-183287 A | 8/2010 |
| WO | 2008/081531 A1 | 7/2008 |
| WO | 2008/115247 A1 | 9/2008 |
| WO | 2011/062459 A3 | 5/2011 |
| WO | 2011/086655 A1 | 7/2011 |
| WO | 2012/019398 A1 | 2/2012 |

OTHER PUBLICATIONS

"Feasibility of coverage extension of physical channels for MTC devices", Alcatel-Lucent, 3GPP TSG-RAN WG1 Meeting #72, Jan. 28-Feb. 1, 2013, 7 pages, R1-130462.

"Analysis and evaluation on PRACH coverage improvement for Low-Cost MTC UEs", Huawei, HiSilicon, 3GPP TSG RAN WG1 Meeting #72bis, Apr. 15-19, 2013, 7 pages, R1-130887.

"Coverage Improvement Analysis of PRACH for TR36.888 and text proposal", ZTE, 3GPP TSG RAN WG1 Meeting #72bis, Apr. 15-19, 2013, 7 pages, R1-131054.

"3rd Generation Partnership Project; Technical Specification Group Radio Access Network; Study on provision of low-cost MTC UEs based on LTE; (Release 12)", 3GPP TR 36.888 V2.0.3, May 2013, 56 pages.

* cited by examiner

SIGNAL TRANSMISSION METHOD, APPARATUS, COMMUNICATIONS SYSTEM, TERMINAL, AND BASE STATION

CROSS REFERENCE TO RELATED APPLICATION

This application is a continuation of International Application No. PCT/CN2013/075645, filed on May 15, 2013, which is incorporated herein by reference in its entirety.

TECHNICAL FIELD

The present invention relates to a communications technology, and in particular, to a signal transmission method and apparatus, a communications system, a terminal, and a base station.

BACKGROUND

Orthogonal frequency division multiple access (OFDMA for short below) has become system key multiple access of a 3G system and/or a 4G system, and is a multiple access technology used by a long term evolution (LTE for short)/long term evolution-advanced (LTE-A for short) system; and a resource used for signal transmission in the multiple access technology is a time-frequency resource, which includes two dimensions: time and frequency. From the dimension of time, one radio frame has a length of 10 ms, and includes 10 subframes; each subframe has a length of 1 ms, and each subframe includes 2 timeslots; each timeslot includes 7 normal cyclic prefixes (CP for short below) or 6 orthogonal frequency division multiple (OFDM for short) symbols (when a CP is extended). From the dimension of frequency, a subcarrier in an OFDM symbol is referred to as a resource element (RE for short below); 12 subcarriers and one timeslot form one resource block (RB for short below); and two resource blocks of one subframe are referred to as a resource block pair, which is often briefly referred to as a resource block. Resource blocks include a physical resource block and a virtual resource block. During a communication process, both service data and system information are transmitted on these time-frequency resources.

In the prior art, a physical random access channel (PRACH for short) is transmitted in one or two subframes, and a maximum transmit time thereof is 2 subframes, that is, 2 ms; and a physical uplink shared channel (PUSCH for short) is generally transmitted in one subframe. Alternatively, after a base station configures transmission time interval (TTI for short) bundling for a terminal; the number of bundling times is specified; the terminal transmits the PUSCH within the bundling times, and the maximum number of TTI bundling times of the PUSCH is 4, that is, a maximum transmit time is 4 subframes, that is, 4 ms.

It can be seen that, the maximum transmit time of the PRACH and the maximum transmit time of the PUSCH are both small, while maximum transmit power at a sending end is a fixed parameter; therefore, energy of the PRACH and energy of the PUSCH are small, leading to short maximum distances for which the PRACH and the PUSCH can be transmitted and poor coverage. Especially, when a signal transmission environment is unsatisfactory, for example, when many barriers exist in a transmission path, or when the weather is bad, the coverage of the PRACH and the PUSCH in the prior art cannot meet a use demand; as a result, a receiving end, such as a base station, cannot accurately receive a signal sent by the sending end.

SUMMARY

The present invention provides a signal transmission method and apparatus, a communications system, a terminal, and a base station, so as to solve the problem of poor channel coverage in a signal transmission method in the prior art.

In a first aspect, an embodiment of the present invention provides a signal transmission method, including:

determining a repetition factor or an extended sequence of a channel;

determining a time domain resource according to the repetition factor or a length of the extended sequence, where the time domain resource is a transmission subframe; and sending a signal by using the transmission subframe of the channel.

In a first possible implementation manner of the first aspect, before the determining a repetition factor or an extended sequence of a channel, the method further includes:

determining a frequency resource of the channel, where correspondingly, the sending a signal by using the transmission subframe of the channel is specifically: sending the signal by using the frequency resource and the transmission subframe of the channel.

In a second possible implementation manner of the first aspect, the channel is a physical random access channel PRACH or a physical uplink shared channel PUSCH.

According to the second possible implementation manner of the first aspect, in a third possible implementation manner, if the channel is the PRACH, the determining a frequency resource of the channel includes:

determining a frequency resource of the PRACH according to a physical resource block offset $n_{PRBoffset}^{RA}$ of the PRACH and the number of resource blocks corresponding to the PRACH; or determining a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

According to the third possible implementation manner of the first aspect, in a fourth possible implementation manner, the number of the resource blocks corresponding to the PRACH is 1, 2, or 3, or is n/12, where n is an integer less than 12.

According to the second possible implementation manner of the first aspect, in a fifth possible implementation manner, if the channel is the PUSCH, the determining a frequency resource of the channel includes:

determining a frequency resource of the PUSCH according to a resource block indication and a resource element set indication of the PUSCH.

According to the fifth possible implementation manner of the first aspect, in a sixth possible implementation manner, the resource element set indication of the PUSCH is used to determine a virtual subcarrier.

According to any one of the first aspect and the first to sixth possible implementation manners of the first aspect, in a seventh possible implementation manner, before the determining a repetition factor or an extended sequence of a channel, the method further includes:

receiving a notification message sent by a base station, where the notification message includes the repetition factor of the channel, and the determining a repetition factor of a channel is specifically: obtaining the repetition factor of the channel included in the notification message, and determining a repetition factor; or receiving a notification message sent by a base station, where the notification message includes an extended sequence identifier, and the determining an extended sequence of a channel is specifically: obtaining the extended sequence identifier included in the notification message, and determining an extended sequence according to the extended sequence identifier.

According to the seventh possible implementation manner of the first aspect, in an eighth possible implementation manner, the channel is the PRACH, and the notification message further includes the physical resource block offset $n_{PRBoffset}^{RA}$ and the subcarrier offset $n_{Subcarrieroffset}^{RA}$ of the PRACH.

According to the seventh possible implementation manner of the first aspect, in a ninth possible implementation manner, the channel is the PUSCH, and the notification message further includes the resource block indication and the resource element set indication of the PUSCH.

According to any one of the seventh to ninth possible implementation manners of the first aspect, in a tenth possible implementation manner, the frequency resource of the channel included in the notification message corresponds to at least one repetition factor or at least one extended sequence identifier.

According to any one of the seventh to tenth possible implementation manners of the first aspect, in an eleventh possible implementation manner, if the channel is the PRACH, the notification message is a system information block SIB message and/or a downlink control information DCI message.

According to the eleventh possible implementation manner of the first aspect, in a twelfth possible implementation manner, if the notification message is the SIB message, information of the frequency resource of the PRACH or a repetition factor or an extended sequence identifier of the PRACH is located in a physical random access channel configuration information PRACH-ConfigInfo field of the SIB message or a physical random access channel machine type communication configuration information PRACH-ConfigInfoMTC field.

According to the eleventh possible implementation manner of the first aspect, in a thirteenth possible implementation manner, if the notification message is the DCI message, information of the frequency resource of the PRACH or a repetition factor or an extended sequence identifier of the PRACH is located in an extended field of the DCI message, or a repetition factor or an extended sequence identifier of the PRACH is indicated through joint coding with a preamble index of the PRACH.

According to the seventh possible implementation manner of the first aspect, in a fourteenth possible implementation manner, the receiving a notification message sent by a base station includes:

receiving an SIB message, where the SIB message includes information of a group of frequency resources of the PRACH or a group of repetition factors of the PRACH or a group of extended sequence identifiers; and receiving a DCI message, where the DCI message includes information of one frequency resource in the group of frequency resources of the PRACH or one repetition factor in the group of repetition factors of the PRACH or one extended sequence identifier in the group of extended sequence identifiers.

According to any one of the seventh to tenth possible implementation manners of the first aspect, in a fifteenth possible implementation manner, if the channel is the PUSCH, the notification message is an RRC message or a DCI message.

According to the fifteenth possible implementation manner of the first aspect, in a sixteenth possible implementation manner, if the notification message is the RRC message, information of the frequency resource of the PUSCH or a repetition factor or an extended sequence identifier of the PUSCH is located in a physical uplink shared channel configuration PUSCH-Config field of the RRC message or a physical uplink shared channel dedicated configuration PUSCH-ConfigDedicated field.

According to the fifteenth possible implementation manner of the first aspect, in a seventeenth possible implementation manner, if the notification message is the DCI message, information of the frequency resource of the PUSCH or a repetition factor or an extended sequence identifier of the PUSCH is located in an extended field of the DCI message, or the resource element set indication or a repetition factor or an extended sequence identifier of the PUSCH is indicated through joint coding with resource block indication information of the PUSCH.

According to the seventh possible implementation manner of the first aspect, in an eighteenth possible implementation manner, the receiving a notification message sent by a base station includes:

receiving an RRC message, where the RRC message includes information of a group of frequency resources of the PUSCH or repetition factors of the PUSCH or extended sequence identifiers; and receiving a DCI message, where the DCI message includes information of one frequency resource in the information of the group of frequency resources of the PUSCH or one repetition factor in the group of repetition factors of the PUSCH or one extended sequence identifier in the group of extended sequence identifiers.

According to any one of the first aspect and the first to eighteenth possible implementation manners of the first aspect, in a nineteenth possible implementation manner, the determining a repetition factor or an extended sequence of a channel includes:

receiving a system message sent by the base station, where the system message includes target receive power of the channel;

determining, according to maximum transmit power, a path loss, and the target receive power of the channel, whether the channel needs to be sent by using the repetition factor or the extended sequence; and if yes, determining the repetition factor of the channel, or determining the length of the extended sequence of the channel and determining the extended sequence corresponding to the length of the extended sequence.

According to the nineteenth possible implementation manner of the first aspect, in a twentieth possible implementation manner, the determining the repetition factor of the channel, or determining the length of the extended sequence of the channel and determining the extended sequence corresponding to the length of the extended sequence includes:

according to the maximum transmit power, the path loss, and the target receive power of the channel, determining the repetition factor of the channel, or determining the length of the extended sequence of the channel and determining the extended sequence corresponding to the length of the extended sequence.

According to any one of the first aspect and the first to twentieth possible implementation manners of the first aspect, in a twenty-first possible implementation manner, the extended sequence is a Walsh Walsh sequence, or the extended sequence is a sequence generated from a pseudo-noise PN sequence.

According to the twenty-first possible implementation manner of the first aspect, in a twenty-second possible implementation manner, the extended sequence being a sequence generated from a PN sequence includes:

the extended sequence being a sequence generated by using a cell identifier and/or a radio network temporary identifier of a cell in which the terminal is located as an initialization parameter of the PN sequence; or the extended sequence being a sequence generated by using the extended sequence identifier, and a cell identifier and/or a radio network temporary identifier of a cell in which the terminal is located as initialization parameters of the PN sequence.

According to any one of the first aspect, and the first to fourth, seventh to eighth, tenth to fourteenth, and nineteenth to twenty-second possible implementation manners of the first aspect, in a twenty-third possible implementation manner, if the channel is the PRACH, the determining a time domain resource according to the repetition factor or a length of the extended sequence, where the time domain resource is a transmission subframe includes:

determining the number N of transmission subframes according to the repetition factor or the length of the extended sequence, and according to a format of the PRACH; and determining a transmission subframe according to a random access configuration index and the number N of transmission subframes.

According to the twenty-third possible implementation manner of the first aspect, in a twenty-fourth possible implementation manner, the determining a transmission subframe according to a random access configuration index and the number N of transmission subframes includes:

determining an available subframe number of the PRACH in a radio frame according to the random access configuration index; and cyclically using the available subframe number in at least one radio frame, and determining N corresponding subframes as transmission subframes, or using a subframe, which is in a radio frame and corresponds to any one of the available subframe numbers, as a start subframe, and selecting N consecutive subframes beginning from the start subframe as transmission subframes.

According to any one of the first aspect, and the first to second, fifth to seventh, ninth to tenth, and fifteenth to twenty-second possible implementation manners of the first aspect, in a twenty-fifth possible implementation manner, if the channel is the PUSCH, the determining a time domain resource according to the repetition factor or a length of the extended sequence includes:

determining the number N of transmission subframes according to the repetition factor or the length of the extended sequence, and according to a format of the PUSCH; and using a transmission subframe of the original PUSCH as a start subframe m, and selecting N consecutive subframes beginning from the start subframe m as transmission subframes.

According to any one of the first aspect, and the first to second, fifth to seventh, ninth to tenth, fifteenth to twenty-second, and twenty-fifth possible implementation manners of the first aspect, in a twenty-sixth possible implementation manner, if the channel is the PUSCH, the sending a signal by using the transmission subframe of the channel includes:

receiving, in a subframe with a subframe number being m1, a DCI message or a hybrid automatic repeat request-acknowledgment HARQ-ACK message sent by the base station, where the subframe m1 is before a subframe p1+4, and p1 is a subframe number of an end subframe in one PUSCH transmission; and if the DCI message or the HARQ-ACK message indicates that the base station has successfully received a signal in current PUSCH transmission, terminating the current transmission in a subframe m1+k1, where k1 is a preset integer.

According to any one of the first aspect, the first to fourth, seventh to eighth, tenth to fourteenth, and nineteenth to twenty-fourth possible implementation manners of the first aspect, in a twenty-seventh possible implementation manner, if the channel is the PRACH, the sending a signal by using the transmission subframe of the channel includes:

determining a subframe number w of a start subframe of a time window and a length of the time window, where the start subframe w of the time window is before a subframe p2+3, and p2 is a subframe number of an end subframe in one PRACH transmission;

receiving, in a subframe with a subframe number being m2 in the time window, a random access response RAR sent by the base station; and terminating current transmission in a subframe m2+k2, where k2 is a preset integer.

According to the twenty-seventh possible implementation manner of the first aspect, in a twenty-eighth possible implementation manner, the determining a subframe number w of a start subframe of a time window includes:

determining the start subframe w of the time window according to that w=p2−t1 or w=n2+t2, where t1 and t2 are preset integers, and n2 is a subframe number of a start subframe in one PRACH transmission.

According to a second aspect, an embodiment of the present invention provides a signal transmission method, including:

determining a repetition factor or an extended sequence of a channel;

determining a time domain resource according to the repetition factor or a length of the extended sequence, where the time domain resource is a transmission subframe; and receiving a signal by using the transmission subframe of the channel.

In a first possible implementation manner of the second aspect, before the determining a repetition factor or an extended sequence of a channel, the method further includes:

determining a frequency resource of the channel, where correspondingly, the receiving a signal by using the transmission subframe of the channel is specifically: receiving the signal by using the frequency resource and the transmission subframe of the channel.

According to the first possible implementation manner of the second aspect, in a second possible implementation manner, the channel is a physical random access channel PRACH or a physical uplink shared channel PUSCH.

According to the second possible implementation manner of the second aspect, in a third possible implementation manner, if the channel is the PRACH, the determining a frequency resource of the channel includes:

determining a frequency resource of the PRACH according to a physical resource block offset $n_{PRBoffset}^{RA}$ of the PRACH and the number of resource blocks corresponding to the PRACH; or determining a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

According to the third possible implementation manner of the second aspect, in a fourth possible implementation manner, the number of the resource blocks corresponding to the PRACH is 1, 2, or 3, or is n/12, where n is an integer less than 12.

According to the second possible implementation manner of the second aspect, in a fifth possible implementation manner, if the channel is the PUSCH, the determining a frequency resource of the channel includes:

determining a frequency resource of the PUSCH according to a resource block indication and a resource element set indication of the PUSCH.

According to the fifth possible implementation manner of the second aspect, in a sixth possible implementation manner, the resource element set indication of the PUSCH is used to determine a virtual subcarrier.

According to any one of the second aspect, and the first to sixth possible implementation manners of the second aspect, in a seventh possible implementation manner, after the determining a repetition factor or an extended sequence of a channel, the method further includes:

sending a notification message to the terminal, where the notification message includes the repetition factor or the extended sequence identifier of the channel, so as to instruct the terminal to determine, according to the notification message, the repetition factor or the extended sequence of the channel.

According to the seventh possible implementation manner of the second aspect, in an eighth possible implementation manner, the channel is the PRACH, and the notification message further includes the physical resource block offset $n_{PRBoffset}^{RA}$ of the PRACH and the subcarrier offset $n_{Subcarrieroffset}^{RA}$ of the PRACH, so that the terminal determines the frequency resource of the PRACH according to the notification message.

According to the seventh possible implementation manner of the second aspect, in a ninth possible implementation manner, the channel is the PUSCH, and the notification message further includes the resource block indication and the resource element set indication of the PUSCH, which are included in the notification message sent to the terminal, so that the terminal determines the frequency resource of the PUSCH according to the notification message.

According to any one of the seventh to ninth possible implementation manners of the second aspect, in a tenth possible implementation manner, the frequency resource of the channel included in the notification message corresponds to at least one repetition factor or at least one extended sequence identifier.

According to any one of the seventh to tenth possible implementation manners of the second aspect, in an eleventh possible implementation manner, if the channel is the PRACH, the notification message is a system information block SIB message and/or a downlink control information DCI message.

According to the eleventh possible implementation manner of the second aspect, in a twelfth possible implementation manner, if the notification message is the SIB message, information of the frequency resource of the PRACH or a repetition factor or an extended sequence identifier of the PRACH is located in a physical random access channel configuration information PRACH-ConfigInfo field of the SIB message or a physical random access channel machine type communication configuration information PRACH-ConfigInfoMTC field.

According to the eleventh possible implementation manner of the second aspect, in a thirteenth possible implementation manner, if the notification message is the DCI message, information of the frequency resource of the PRACH or a repetition factor or an extended sequence identifier of the PRACH is located in an extended field of the DCI message, or a repetition factor or an extended sequence identifier of the PRACH is indicated through joint coding with a preamble index of the PRACH.

According to the seventh possible implementation manner of the second aspect, in a fourteenth possible implementation manner, the sending a notification message to the terminal includes:

sending an SIB message to the terminal, where the SIB message includes information of a group of frequency resources of the PRACH or a group of repetition factors of the PRACH or a group of extended sequence identifiers; and sending a DCI message to the terminal, where the DCI message includes information of one frequency resource in the information of the group of frequency resources of the PRACH or one repetition factor in the group of repetition factors of the PRACH or one extended sequence identifier in the group of extended sequence identifiers.

According to any one of the seventh to tenth possible implementation manners of the second aspect, in a fifteenth possible implementation manner, if the channel is the PUSCH, the notification message is an RRC message or a DCI message.

According to the fifteenth possible implementation manner of the second aspect, in a sixteenth possible implementation manner, if the notification message is the RRC message, information of the frequency resource of the PUSCH or a repetition factor or an extended sequence identifier of the PUSCH is located in a physical uplink shared channel configuration PUSCH-Config field of the RRC message or a physical uplink shared channel dedicated configuration PUSCH-ConfigDedicated field.

According to the sixteenth possible implementation manner of the second aspect, in a seventeenth possible implementation manner, if the notification message is the DCI message, information of the frequency resource of the PUSCH or a repetition factor or an extended sequence identifier of the PUSCH is located in an extended field of the DCI message, or the resource element set indication or a repetition factor or an extended sequence identifier of the PUSCH is indicated through joint coding with resource block indication information of the PUSCH.

According to the seventh possible implementation manner of the second aspect, in an eighteenth possible implementation manner, the sending a notification message to the terminal includes:

sending an RRC message to the terminal, where the RRC message includes information of a group of frequency resources of the PUSCH or a group of repetition factors of the PUSCH or a group of extended sequence identifiers; and sending a DCI message to the terminal, where the DCI message includes information of one frequency resource in the information of the group of frequency resources of the PUSCH or one repetition factor in the group of repetition factors of the PUSCH or one extended sequence identifier in the group of extended sequence identifiers.

According to any one of the second aspect and the first to eighteenth possible implementation manners of the second aspect, in a nineteenth possible implementation manner, before the determining a repetition factor or an extended sequence of a channel, the method further includes:

sending a system message to the terminal, where the system message includes target receive power of the channel, so that the terminal determines, according to maximum transmit power, a path loss, and the target receive power of the channel, whether the signal needs to be sent on the channel by using the repetition factor or the extended sequence.

According to the nineteenth possible implementation manner of the second aspect, in a twentieth possible implementation manner, the system message further includes an available repetition factor, or further includes an extended sequence identifier of an available extended sequence, and the extended sequence and the extended sequence identifier correspond to the length of the extended sequence.

According to any one of the second aspect and the first to twentieth possible implementation manners of the second aspect, in a twenty-first possible implementation manner, a quantity of repetition factors or extended sequences of the channel is at least two, and the determining a time domain resource according to the repetition factor or a length of the extended sequence includes: determining transmission subframes corresponding to the at least two repetition factors or determining a length of each extended sequence and determining transmission subframes; and the receiving a signal by using the transmission subframe of the channel includes: receiving the signal in the transmission subframes corresponding to the at least two repetition factors of the channel or in the transmission subframes determined according to the lengths of the extended sequences.

According to any one of the second aspect and the first to twenty-first possible implementation manners of the second aspect, in a twenty-second possible implementation manner, the extended sequence is a Walsh Walsh sequence, or the extended sequence is a sequence generated from a pseudo-noise PN sequence.

According to the twenty-second possible implementation manner of the second aspect, in a twenty-third possible implementation manner, the extended sequence being a sequence generated from a PN sequence includes:

the extended sequence being a sequence generated by using a cell identifier and/or a radio network temporary identifier of a cell in which the terminal is located as an initialization parameter of the PN sequence; or the extended sequence being a sequence generated by using the extended sequence identifier, and a cell identifier and/or a radio network temporary identifier of a serving cell of the terminal as initialization parameters of the PN sequence.

According to any one of the second aspect, and the first to fourth, seventh to eighth, tenth to fourteenth, and nineteenth to twenty-third possible implementation manners of the second aspect, in a twenty-fourth possible implementation manner, if the channel is the PRACH, the determining a time domain resource according to the repetition factor or a length of the extended sequence, where the time domain resource is a transmission subframe includes:

determining the number N of transmission subframes according to the repetition factor or the length of the extended sequence, and according to a format of the PRACH; and determining a transmission subframe according to a random access configuration index and the number N of transmission subframes.

According to the twenty-fourth possible implementation manner of the second aspect, in a twenty-fifth possible implementation manner, the determining a transmission subframe according to a random access configuration index and the number N of transmission subframes includes:

determining an available subframe number of the PRACH in a radio frame according to the random access configuration index; and cyclically using the available subframe number in at least one radio frame, and determining N corresponding subframes as transmission subframes, or using a subframe, which is in a radio frame and corresponds to any one of the available subframe numbers, as a start subframe, and selecting N consecutive subframes beginning from the start subframe as transmission subframes.

According to any one of the second aspect, and the first to third, fifth to seventh, ninth to tenth, and fifteenth to twenty-third possible implementation manners of the second aspect, in a twenty-sixth possible implementation manner, if the channel is the PUSCH, the determining a time domain resource according to the repetition factor or a length of the extended sequence, where the time domain resource is a transmission subframe includes:

determining the number N of transmission subframes according to the repetition factor or the length of the extended sequence, and according to a format of the PUSCH; and using a transmission subframe of the original PUSCH as a start subframe, and selecting N consecutive subframes beginning from the start subframe as transmission subframes.

According to any one of the second aspect, and the first to third, fifth to seventh, ninth to tenth, fifteenth to twenty-third, and twenty-sixth possible implementation manners of the second aspect, in a twenty-seventh possible implementation manner, if the channel is the PUSCH, the receiving a signal in the transmission subframe includes:

sending, in a subframe with a subframe number being m1, a DCI message or a hybrid automatic repeat request-acknowledgment HARQ-ACK message to the terminal, where the DCI message or the HARQ-ACK message indicates that the base station has successfully received a signal in current PUSCH transmission, where the subframe m1 is before a subframe p1+4, and p1 is a subframe number of an end subframe in one PUSCH transmission; and in a subframe m1+k1, stopping receiving a signal in current transmission, where a subframe m is before a subframe p+4, and k1 is a preset integer.

According to any one of the second aspect, and the first to fourth, seventh to eighth, tenth to fourteenth, and nineteenth to twenty-fifth possible implementation manners of the second aspect, in a twenty-eighth possible implementation manner, if the channel is the PRACH, the receiving a signal in the transmission subframe includes:

determining a subframe number w of a start subframe of a time window and a length of the time window, where the start subframe w of the time window is before a subframe p2+3, and p2 is a subframe number of an end subframe in one PRACH transmission;

sending, in a subframe with a subframe number being m2 in the time window, a random access response RAR to the terminal; and in a subframe m2+k2, stopping receiving a signal in current transmission, where k2 is a preset integer.

According to the twenty-eighth possible implementation manner of the second aspect, in a twenty-ninth possible implementation manner, the determining a subframe number w of a start subframe of a time window includes:

determining the start subframe w of the time window according to that w=p−t1 or w=n+t2, where t1 and t2 are preset integers, and n2 is a subframe number of a start subframe in one PRACH transmission.

According to a third aspect, an embodiment of the present invention provides a signal transmission apparatus, including:

a module for determining a repetition factor or an extended sequence, configured to determine a repetition factor or an extended sequence of a channel;

a transmission subframe determining module, configured to determine a time domain resource according to the repetition factor or a length of the extended sequence, where the time domain resource is a transmission subframe; and a sending module, configured to send a signal by using the transmission subframe of the channel.

In a first possible implementation manner of the third aspect, the apparatus further includes:

a frequency resource determining module, configured to determine a frequency resource of the channel, where correspondingly, the sending module is specifically configured to send the signal by using the frequency resource and the transmission subframe of the channel.

In a second possible implementation manner of the third aspect, the channel is a physical random access channel PRACH or a physical uplink shared channel PUSCH.

According to the second possible implementation manner of the third aspect, in a third possible implementation manner, if the channel is the PRACH, the frequency resource determining module is specifically configured to:

determine a frequency resource of the PRACH according to a physical resource block offset $n_{PRBoffset}^{RA}$ of the PRACH and the number of resource blocks corresponding to the PRACH; or determine a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

According to the third possible implementation manner of the third aspect, in a fourth possible implementation manner, the number of the resource blocks corresponding to the PRACH is 1, 2, or 3, or is n/12, where n is an integer less than 12.

According to the second possible implementation manner of the third aspect, in a fifth possible implementation manner, if the channel is the PUSCH, the frequency resource determining module is specifically configured to:

determine a frequency resource of the PUSCH according to a resource block indication and a resource element set indication of the PUSCH.

According to the fifth possible implementation manner of the third aspect, in a sixth possible implementation manner, the resource element set indication of the PUSCH is used to determine a virtual subcarrier.

According to any one of the third aspect and the first to sixth possible implementation manners of the third aspect, in a seventh possible implementation manner, the apparatus further includes:

a notification message receiving module, configured to receive a notification message sent by a base station, where the notification message includes the repetition factor of the channel, and the module for determining a repetition factor or an extended sequence is specifically configured to obtain the repetition factor of the channel included in the notification message, and determine a repetition factor; or the notification message receiving module, configured to receive a notification message sent by a base station, where the notification message includes an extended sequence identifier, and the module for determining a repetition factor or an extended sequence is specifically configured to determine an extended sequence according to the extended sequence identifier.

According to the seventh possible implementation manner of the third aspect, in an eighth possible implementation manner, the channel is the PRACH, and the notification message further includes the physical resource block offset $n_{PRBoffset}^{RA}$ and the subcarrier offset $n_{Subcarrieroffset}^{RA}$ of the PRACH.

According to the seventh possible implementation manner of the third aspect, in a ninth possible implementation manner, the channel is the PUSCH, and the notification message further includes the resource block indication and the resource element set indication of the PUSCH.

According to any one of the seventh to ninth possible implementation manners of the third aspect, in a tenth possible implementation manner, the frequency resource of the channel included in the notification message corresponds to at least one repetition factor or at least one extended sequence identifier.

According to any one of the seventh to tenth possible implementation manners of the third aspect, in an eleventh possible implementation manner, if the channel is the PRACH, the notification message is a system information block SIB message and/or a downlink control information DCI message.

According to the eleventh possible implementation manner of the third aspect, in a twelfth possible implementation manner, if the notification message is the SIB message, information of the frequency resource of the PRACH or a repetition factor or an extended sequence identifier of the PRACH is located in a physical random access channel configuration information PRACH-ConfigInfo field of the SIB message or a physical random access channel machine type communication configuration information PRACH-ConfigInfoMTC field.

According to the eleventh possible implementation manner of the third aspect, in a thirteenth possible implementation manner, if the notification message is the DCI message, information of the frequency resource of the PRACH or a repetition factor or an extended sequence identifier of the PRACH is located in an extended field of the DCI message, or a repetition factor or an extended sequence identifier of the PRACH is indicated through joint coding with a preamble index of the PRACH.

According to the seventh possible implementation manner of the third aspect, in a fourteenth possible implementation manner, the notification message receiving module includes:

an SIB receiving unit, configured to receive an SIB message, where the SIB message includes information of a group of frequency resources of the PRACH or a group of repetition factors of the PRACH or a group of extended sequence identifiers; and a DCI receiving unit, configured to receive a DCI message, where the DCI message includes information of one frequency resource in the group of frequency resources of the PRACH or one repetition factor in the group of repetition factors of the PRACH or one extended sequence identifier in the group of extended sequence identifiers.

According to any one of the seventh to tenth possible implementation manners of the third aspect, in a fifteenth possible implementation manner, if the channel is the PUSCH, the notification message is an RRC message or a DCI message.

According to the fifteenth possible implementation manner of the third aspect, in a sixteenth possible implementation manner, if the notification message is the RRC message, information of the frequency resource of the PUSCH or a repetition factor or an extended sequence identifier of the PUSCH is located in a physical uplink shared channel configuration PUSCH-Config field of the RRC message or a physical uplink shared channel dedicated configuration PUSCH-ConfigDedicated field.

According to the fifteenth possible implementation manner of the third aspect, in a seventeenth possible implementation manner, if the notification message is the DCI message, information of the frequency resource of the PUSCH or a repetition factor or an extended sequence identifier of the PUSCH is located in an extended field of the DCI message, or the resource element set indication or a repetition factor or an extended sequence identifier of the PUSCH is indicated through joint coding with resource block indication information of the PUSCH.

According to the seventh possible implementation manner of the third aspect, in an eighteenth possible implementation manner, the notification message receiving module includes:

an RRC receiving unit, configured to receive an RRC message, where the RRC message includes information of a group of frequency resources of the PUSCH or repetition factors of the PUSCH or extended sequence identifiers; and a DCI receiving unit, configured to receive a DCI message, where the DCI message includes information of one frequency resource in the information of the group of frequency resources of the PUSCH or one repetition factor in the group of repetition factors of the PUSCH or one extended sequence identifier in the group of extended sequence identifiers.

According to any one of the third aspect and the first to eighteenth possible implementation manners of the third aspect, in a nineteenth possible implementation manner, the module for determining a repetition factor or an extended sequence includes:

a target power obtaining unit, configured to receive a system message sent by the base station, where the system message includes target receive power of the channel;

a judging unit, configured to determine, according to maximum transmit power, a path loss, and the target receive power of the channel, whether the channel needs to be sent by using the repetition factor or the extended sequence; and a determining unit, configured to: if yes, determine the repetition factor of the channel, or determine the length of the extended sequence of the channel and determine the extended sequence corresponding to the length of the extended sequence.

According to the nineteenth possible implementation manner of the third aspect, in a twentieth possible implementation manner, the determining unit is specifically configured to:

according to the maximum transmit power, the path loss, and the target receive power of the channel, determine the repetition factor of the channel, or determine the length of the extended sequence of the channel and determine the extended sequence corresponding to the length of the extended sequence.

According to any one of the third aspect and the first to twentieth possible implementation manners of the third aspect, in a twenty-first possible implementation manner, the extended sequence is a Walsh Walsh sequence, or the extended sequence is a sequence generated from a pseudo-noise PN sequence.

According to the twenty-first possible implementation manner of the third aspect, in a twenty-second possible implementation manner, the extended sequence being a sequence generated from a PN sequence includes:

the extended sequence being a sequence generated by using a cell identifier and/or a radio network temporary identifier of a cell in which the terminal is located as an initialization parameter of the PN sequence; or the extended sequence being a sequence generated by using the extended sequence identifier, and a cell identifier and/or a radio network temporary identifier of a cell in which the terminal is located as initialization parameters of the PN sequence.

According to any one of the third aspect, and the first to fourth, seventh to eighth, tenth to fourteenth, and nineteenth to twenty-second possible implementation manners of the third aspect, in a twenty-third possible implementation manner, the transmission subframe determining module includes: a transmission subframe number determining unit and a transmission subframe determining unit, and if the channel is the PRACH, the transmission subframe number determining unit is configured to determine the number N of time domain resources according to the repetition factor or the length of the extended sequence, and according to a format of the PRACH; and the transmission subframe determining unit is configured to determine a transmission subframe according to a random access configuration index and the number N of transmission subframes.

According to the twenty-third possible implementation manner of the third aspect, in a twenty-fourth possible implementation manner, the transmission subframe determining unit is specifically configured to:

determine an available subframe number of the PRACH in a radio frame according to the random access configuration index; and cyclically use the available subframe number in at least one radio frame, and determine N corresponding subframes as transmission subframes, or use a subframe, which is in a radio frame and corresponds to any one of the available subframe numbers, as a start subframe, and select N consecutive subframes beginning from the start subframe as transmission subframes.

According to any one of the third aspect, and the first to second, fifth to seventh, ninth to tenth, and fifteenth to twenty-second possible implementation manners of the third aspect, in a twenty-fifth possible implementation manner, if the channel is the PUSCH, the transmission subframe number determining unit is configured to determine the number N of transmission subframes according to the repetition factor or the length of the extended sequence, and according to a format of the PUSCH; and the transmission subframe determining unit is configured to use a transmission subframe of the original PUSCH as a start subframe m, and select N consecutive subframes beginning from the start subframe m as transmission subframes.

According to any one of the third aspect, and the first to second, fifth to seventh, ninth to tenth, fifteenth to twenty-second, and twenty-fifth possible implementation manners of the third aspect, in a twenty-sixth possible implementation manner, if the channel is the PUSCH, the sending module includes:

an HARQ-ACK message receiving unit, configured to receive, in a subframe with a subframe number being m1, a DCI message or a hybrid automatic repeat request-acknowledgment HARQ-ACK message sent by the base station, where the subframe m1 is before a subframe p1+4, and p1 is a subframe number of an end subframe in one PUSCH transmission; and a first termination unit, configured to: if the DCI message or the HARQ-ACK message indicates that the base station has successfully received a signal in current PUSCH transmission, terminate the current transmission in a subframe m1+k1, where k1 is a preset integer.

According to any one of the third aspect, and the first to fourth, seventh to eighth, tenth to fourteenth, nineteenth and twenty-fourth possible implementation manners of the third aspect, in a twenty-seventh possible implementation manner, if the channel is the PRACH, the sending module includes:

a time window determining unit, configured to determine a subframe number w of a start subframe of a time window and a length of the time window, where the start subframe w of the time window is before a subframe p2+3, and p2 is a subframe number of an end subframe in one PRACH transmission;

an RAR receiving unit, configured to receive, in a subframe with a subframe number being m2 in the time window, a random access response RAR sent by the base station; and a second termination unit, configured to terminate current transmission in a subframe m2+k2, where k2 is a preset integer.

According to the twenty-seventh possible implementation manner of the third aspect, in a twenty-eighth possible implementation manner, the time window determining unit includes:

a subunit for determining a start subframe of a time window, specifically configured to determine the start subframe w of the time window according to that w=p2−t1 or w=n2+t2, where t1 and t2 are preset integers, and n2 is a subframe number of a start subframe in one PRACH transmission.

According to a fourth aspect, an embodiment of the present invention provides a signal transmission apparatus, including:

a module for determining a repetition factor or an extended sequence, configured to determine a repetition factor or an extended sequence of a channel;

a transmission subframe determining module, configured to determine a time domain resource according to the repetition factor or a length of the extended sequence, where the time domain resource is a transmission subframe; and a receiving module, configured to receive a signal by using the transmission subframe of the channel.

In a first possible implementation manner of the fourth aspect, the apparatus further includes:

a frequency resource determining module, configured to determine a frequency resource of the channel, where correspondingly, the receiving module is specifically configured to receive the signal by using the frequency resource and the transmission subframe of the channel.

According to the first possible implementation manner of the fourth aspect, in a second possible implementation manner, the channel is a physical random access channel PRACH or a physical uplink shared channel PUSCH.

According to the second possible implementation manner of the fourth aspect, in a third possible implementation manner, if the channel is the PRACH, the frequency resource determining module is specifically configured to:

determine a frequency resource of the PRACH according to a physical resource block offset $n_{PRBoffset}^{RA}$ of the PRACH and the number of resource blocks corresponding to the PRACH; or determine a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

According to the third possible implementation manner of the fourth aspect, in a fourth possible implementation manner, the number of the resource blocks corresponding to the PRACH is 1, 2, or 3, or is n/12, where n is an integer less than 12.

According to the second possible implementation manner of the fourth aspect, in a fifth possible implementation manner, if the channel is the PUSCH, the frequency resource determining module is specifically configured to:

determine a frequency resource of the PUSCH according to a resource block indication and a resource element set indication of the PUSCH.

According to the fifth possible implementation manner of the fourth aspect, in a sixth possible implementation manner, the resource element set indication of the PUSCH is used to determine a virtual subcarrier.

According to any one of the fourth aspect and the first to sixth possible implementation manners of the fourth aspect, in a seventh possible implementation manner, the apparatus further includes:

a notification message sending module, configured to send a notification message to the terminal, where the notification message includes the repetition factor or the extended sequence identifier of the channel, so as to instruct the terminal to determine, according to the notification message, the repetition factor or the extended sequence of the channel.

According to the seventh possible implementation manner of the fourth aspect, in an eighth possible implementation manner, the channel is the PRACH, and the notification message further includes the physical resource block offset $n_{PRBoffset}^{RA}$ of the PRACH and the subcarrier offset $n_{Subcarrieroffset}^{RA}$ of the PRACH, so that the terminal determines the frequency resource of the PRACH according to the notification message.

According to the seventh possible implementation manner of the fourth aspect, in a ninth possible implementation manner, the channel is the PUSCH, and the notification message further includes the resource block indication and the resource element set indication of the PUSCH, which are included in the notification message sent to the terminal, so that the terminal determines the frequency resource of the PUSCH according to the notification message.

According to any one of the seventh to ninth possible implementation manners of the fourth aspect, in a tenth possible implementation manner, the frequency resource of the channel included in the notification message corresponds to at least one repetition factor or at least one extended sequence identifier.

According to any one of the seventh to tenth possible implementation manners of the fourth aspect, in an eleventh possible implementation manner, if the channel is the PRACH, the notification message is a system information block SIB message and/or a downlink control information DCI message.

According to the eleventh possible implementation manner of the fourth aspect, in a twelfth possible implementation manner, if the notification message is the SIB message, information of the frequency resource of the PRACH or a repetition factor or an extended sequence identifier of the PRACH is located in a physical random access channel configuration information PRACH-ConfigInfo field of the SIB message or a physical random access channel machine type communication configuration information PRACH-ConfigInfoMTC field.

According to the eleventh possible implementation manner of the fourth aspect, in a thirteenth possible implementation manner, if the notification message is the DCI message, information of the frequency resource of the PRACH or a repetition factor or an extended sequence identifier of the PRACH is located in an extended field of the DCI message, or a repetition factor or an extended sequence identifier of the PRACH is indicated through joint coding with a preamble index of the PRACH.

According to the seventh possible implementation manner of the fourth aspect, in a fourteenth possible implementation manner, the notification message sending module includes:

an SIB sending unit, configured to send an SIB message to the terminal, where the SIB message includes information of a group of frequency resources of the PRACH or a group of repetition factors of the PRACH or a group of extended sequence identifiers; and a DCI sending unit, configured to send a DCI message to the terminal, where the DCI message includes information of one frequency resource in the information of the group of frequency resources of the PRACH or one repetition factor in the group of repetition factors of the PRACH or one extended sequence identifier in the group of extended sequence identifiers.

According to any one of the seventh to tenth possible implementation manners of the fourth aspect, in a fifteenth possible implementation manner, if the channel is the PUSCH, the notification message is an RRC message or a DCI message.

According to the fifteenth possible implementation manner of the fourth aspect, in a sixteenth possible implementation manner, if the notification message is the RRC message, information of the frequency resource of the PUSCH or a repetition factor or an extended sequence identifier of the PUSCH is located in a physical uplink shared channel configuration PUSCH-Config field of the RRC message or a physical uplink shared channel dedicated configuration PUSCH-ConfigDedicated field.

According to the sixteenth possible implementation manner of the fourth aspect, in a seventeenth possible implementation manner, if the notification message is the DCI message, information of the frequency resource of the PUSCH or a repetition factor or an extended sequence identifier of the PUSCH is located in an extended field of the DCI message, or the resource element set indication or a repetition factor or an extended sequence identifier of the PUSCH is indicated through joint coding with resource block indication information of the PUSCH.

According to the seventh possible implementation manner of the fourth aspect, in an eighteenth possible implementation manner, the notification message sending module includes:

an RRC sending unit, configured to send an RRC message to the terminal, where the RRC message includes information of a group of frequency resources of the PUSCH or a group of repetition factors of the PUSCH or a group of extended sequence identifiers; and a DCI sending unit, configured to send a DCI message to the terminal, where the DCI message includes information of one frequency resource in the information of the group of frequency resources of the PUSCH or one repetition factor in the group of repetition factors of the PUSCH or one extended sequence identifier in the group of extended sequence identifiers.

According to any one of the fourth aspect and the first to eighteenth possible implementation manners of the fourth aspect, in a nineteenth possible implementation manner, the apparatus further includes:

a target power sending module, configured to send a system message to the terminal, where the system message includes target receive power of the channel, so that the terminal determines, according to maximum transmit power, a path loss, and the target receive power of the channel, whether the signal needs to be sent on the channel by using the repetition factor or the extended sequence.

According to the nineteenth possible implementation manner of the fourth aspect, in a twentieth possible implementation manner, the system message further includes an available repetition factor, or further includes an extended sequence identifier of an available extended sequence, and the extended sequence and the extended sequence identifier correspond to the length of the extended sequence.

According to any one of the fourth aspect and the first to twentieth possible implementation manners of the fourth aspect, in a twenty-first possible implementation manner, a quantity of repetition factors or extended sequences of the channel is at least two, and the transmission subframe determining module is specifically configured to determine transmission subframes corresponding to the at least two repetition factors or determine a length of each extended sequence and determine transmission subframes; and the receiving module is specifically configured to receive the signal in the transmission subframes corresponding to the at least two repetition factors of the channel or in the transmission subframes determined according to the lengths of the extended sequences.

According to any one of the fourth aspect and the first to twenty-first possible implementation manners of the fourth aspect, in a twenty-second possible implementation manner, the extended sequence is a Walsh Walsh sequence, or the extended sequence is a sequence generated from a pseudo-noise PN sequence.

According to the twenty-second possible implementation manner of the fourth aspect, in a twenty-third possible implementation manner, the extended sequence being a sequence generated from a PN sequence includes:

the extended sequence being a sequence generated by using a cell identifier and/or a radio network temporary identifier of a cell in which the terminal is located as an initialization parameter of the PN sequence; or the extended sequence being a sequence generated by using the extended sequence identifier, and a cell identifier and/or a radio network temporary identifier of a serving cell of the terminal as initialization parameters of the PN sequence.

According to any one of the fourth aspect, and the first to fourth, seventh to eighth, tenth to fourteenth, and nineteenth to twenty-third possible implementation manners of the fourth aspect, in a twenty-fourth possible implementation manner, the transmission subframe determining module includes a transmission subframe number determining unit and a transmission subframe determining unit, and if the channel is the PRACH, the transmission subframe number determining unit is configured to determine the number N of transmission subframes according to the repetition factor or the length of the extended sequence, and according to a format of the PRACH; and the transmission subframe determining unit is configured to determine a transmission subframe according to a random access configuration index and the number N of transmission subframes.

According to the twenty-fourth possible implementation manner of the fourth aspect, in a twenty-fifth possible implementation manner, the transmission subframe determining unit is specifically configured to:

determine an available subframe number of the PRACH in a radio frame according to the random access configuration index; and cyclically use the available subframe number in at least one radio frame, and determine N corresponding subframes as transmission subframes, or use a subframe, which is in a radio frame and corresponds to any one of the available subframe numbers, as a start subframe, and select N consecutive subframes beginning from the start subframe as transmission subframes.

According to any one of the fourth aspect, and the first to third, fifth to seventh, ninth to tenth, and fifteenth to twenty-third possible implementation manners of the fourth aspect, in a twenty-sixth possible implementation manner, if the channel is the PUSCH, the transmission subframe number determining unit is configured to determine the number N of transmission subframes according to the repetition factor or the length of the extended sequence, and according to a format of the PUSCH; and the transmission subframe determining unit is configured to use a transmission subframe of the original PUSCH as a start subframe, and select N consecutive subframes beginning from the start subframe as transmission subframes.

According to any one of the fourth aspect, and the first to third, fifth to seventh, ninth to tenth, fifteenth to twenty-third, and twenty-sixth possible implementation manners of the fourth aspect, in a twenty-seventh possible implementation manner, if the channel is the PUSCH, the receiving module includes:

an HARQ-ACK message sending unit, configured to send, in a subframe with a subframe number being m1, a DCI message or a hybrid automatic repeat request-acknowledgment HARQ-ACK message to the terminal, where the DCI message or the HARQ-ACK message indicates that the base station has successfully received a signal in current PUSCH transmission, the subframe m1 is before a subframe p1+4, and p1 is a subframe number of an end subframe in one PUSCH transmission; and a first termination unit, configured to: in a subframe m1+k1, stop receiving a signal in current transmission, where a subframe m is before a subframe p+4, and k1 is a preset integer.

According to any one of the fourth aspect, and the first to fourth, seventh to eighth, tenth to fourteenth, and nineteenth to twenty-fifth possible implementation manners of the fourth aspect, in a twenty-eighth possible implementation manner, if the channel is the PRACH, the receiving module includes:

a time window determining unit, configured to determine a subframe number w of a start subframe of a time window and a length of the time window, where the start subframe w of the time window is before a subframe p2+3, and p2 is a subframe number of an end subframe in one PRACH transmission;

an RAR sending unit, configured to send, in a subframe with a subframe number being m2 in the time window, a random access response RAR to the terminal; and a second termination unit, configured to: in a subframe m2+k2, stop receiving a signal in current transmission, where k2 is a preset integer.

According to the twenty-eighth possible implementation manner of the fourth aspect, in a twenty-ninth possible implementation manner, the time window determining unit includes:

a subunit for determining a start subframe of a time window, specifically configured to determine the start subframe w of the time window according to that w=p−t1 or w=n+t2, where t1 and t2 are preset integers, and n2 is a subframe number of a start subframe in one PRACH transmission.

According to a fifth aspect, an embodiment of the present invention provides a communications system, including: at least one terminal and one base station, where the terminal includes a signal transmission apparatus according to any one of embodiments of a signal transmission apparatus that can be integrated on the terminal in the present invention; and the base station includes a signal transmission apparatus according to any one of embodiments of a signal transmission apparatus that can be integrated on the base station in the present invention.

According to a sixth aspect, an embodiment of the present invention provides a terminal, including: a receiver, a sender, a memory, and a processor, where the memory is configured to store an instruction; and the processor is coupled with the memory, the processor is configured to execute the instruction stored in the memory, and the processor is configured to execute a signal transmission method, which is executed by a corresponding terminal, in any one of method embodiments in the present invention.

According to a seventh aspect, an embodiment of the present invention provides a base station, including: a receiver, a sender, a memory, and a processor, where the memory is configured to store an instruction; and the processor is coupled with the memory, the processor is configured to execute the instruction stored in the memory, and the processor is configured to execute a signal transmission method, which is executed by a corresponding base station, in any one of method embodiments in the present invention.

According to the signal transmission method and apparatus, the communications system, the terminal, and the base station that are provided by the embodiments of the present invention, the terminal determines a repetition factor or an extended sequence of a channel, and increases the number of transmission subframes of the channel according to the repetition factor or a length of the extended sequence, which prolongs transmit time, thereby increasing transmit energy of the channel and extending the coverage of the channel; and the base station determines a repetition factor or an extended sequence of a channel, and increases the number of transmission subframes for receiving the channel, which prolongs receive time, thereby increasing receive energy of the channel, facilitating demodulation of a signal on the channel, and improving communication quality.

DESCRIPTION OF EMBODIMENTS

Figure 1:
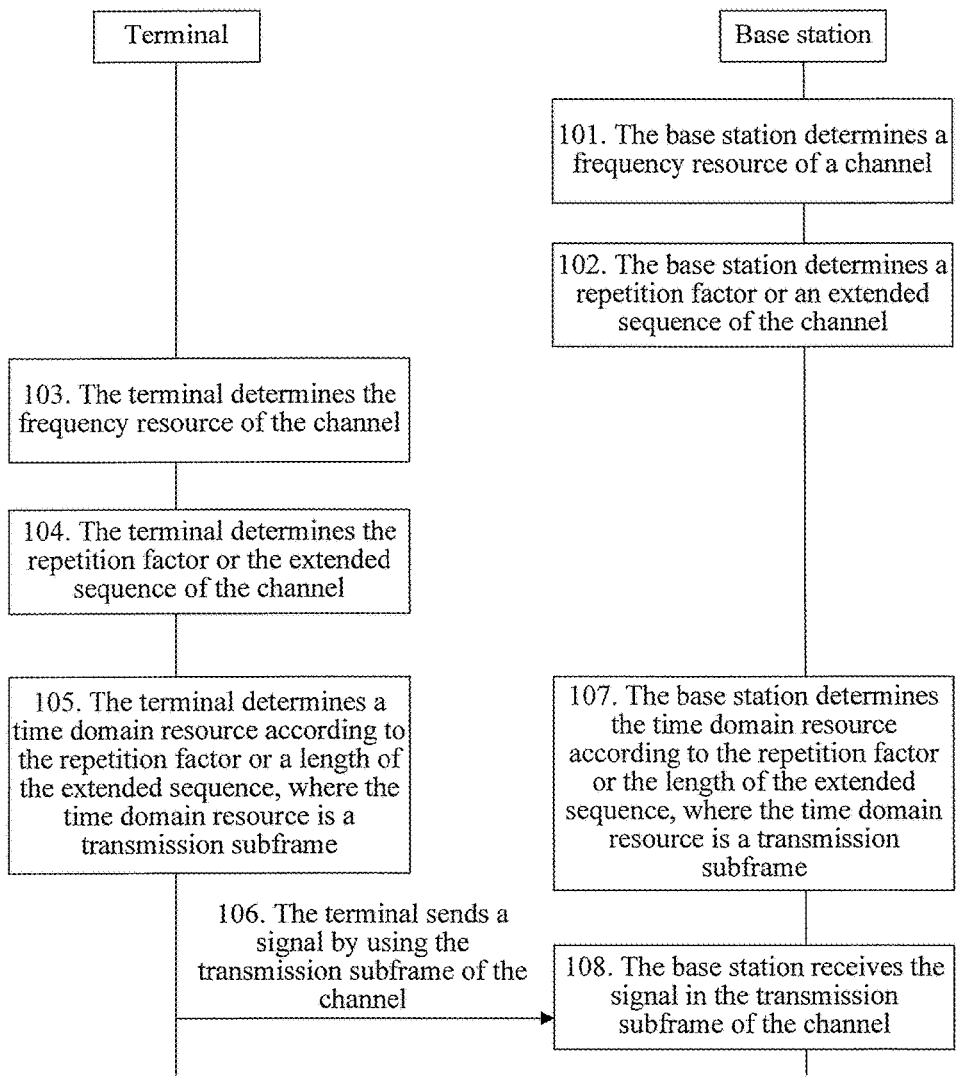
FIG. 1 is a signaling flowchart of a first embodiment of a signal transmission method according to the present invention.

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are a part of the embodiments of the present invention rather than all of the embodiments. All other embodiments obtained by persons of ordinary skill in the art based on the embodiments of the present invention without creative efforts shall fall within the protection scope of the present invention.

Coverage refers to a transmission distance that meets a channel transmission requirement under a condition of a certain transmitter, receiver, and transmission channel. The coverage performance of a channel is affected by many factors, including transmit time, maximum transmit power, receive time, a receive algorithm, a channel structure, and the like, and in a case in which other conditions are unchanged, the longer transmit time is, the more energy is accumulated on the channel, and the longer transmissible distance the channel has; therefore, the coverage is better. In the embodiments of the present invention, a method for increasing transmit time is provided specifically for each of a PRACH and a PUSCH, so as to improve the coverage of the two channels. The method is also applicable to other channels, which is not limited in the embodiments of the present invention.

An embodiment of the present invention provides a method for interaction between a signal sending end and a signal receiving end, where the sending end may be a terminal, and the receiving end may be a base station. The preset integer in the embodiment of the present invention includes an integer obtained through preconfiguration or a pre-specified integer.

An embodiment of the present invention provides a signal transmission method, where a part correspondingly executed by a terminal may include:

determining a repetition factor or an extended sequence of a channel;

determining a time domain resource according to the repetition factor or a length of the extended sequence, where the time domain resource is a transmission subframe; and sending a signal by using the transmission subframe of the channel.

The technical effects of the method for sending a signal by a terminal in this embodiment are as follows: The terminal increases the number of transmission subframes of the channel by using the repetition factor or the extended sequence of the channel and according to the repetition factor or the length of the extended sequence, which prolongs transmit time, thereby increasing transmit energy of the channel; and the coverage of the channel is extended by using the foregoing method.

Further, during specific implementation, before the determining, by the terminal, a repetition factor or an extended sequence of a channel, the method further includes:

determining a frequency resource of the channel, where correspondingly, the sending a signal by using the transmission subframe of the channel is specifically: sending the signal by using the frequency resource and the transmission subframe of the channel.

The technical effects of the method for sending a signal by a terminal in this embodiment are as follows: The terminal sends the signal on a relatively narrow frequency resource by determining the frequency resource of the channel, so that generation power on a single resource can be improved, and a receive signal to noise ratio on the single resource can be improved; moreover, the terminal determines the repetition factor or the extended sequence of the channel and increases the number of transmission subframes of the channel according to the repetition factor or the length of the extended sequence, which prolongs the transmit time, thereby increasing the transmit energy of the channel; and the coverage of the channel is extended by using the foregoing method.

In the foregoing embodiment, the repetition factor or the extended sequence may be determined by a base station and then notified to the terminal, or may be obtained by the terminal through calculation.

For a signal transmission method provided by an embodiment of the present invention, a part correspondingly executed by a base station may include:

determining a repetition factor or an extended sequence of a channel;

determining a time domain resource according to the repetition factor or a length of the extended sequence, where the time domain resource is a transmission subframe; and receiving a signal by using the transmission subframe of the channel.

The technical effects of the method for receiving a signal by a base station in this embodiment are as follows: The base station determines the repetition factor or the extended sequence of the channel and increases the number of transmission subframes for receiving the channel, which prolongs receive time, thereby increasing receive energy of the channel and facilitating demodulation of a signal on the channel; and communication quality is improved by using the foregoing method.

Further, during specific implementation, before the determining, by the base station, a repetition factor or an extended sequence of a channel, the method further includes: determining a frequency resource of the channel, where correspondingly, the receiving a signal by using the transmission subframe of the channel is specifically: receiving the signal by using the frequency resource and the transmission subframe of the channel.

The technical effects of the method for receiving a signal by a base station in this embodiment are as follows: The base station determines the frequency resource of the channel, and receives the signal on a relatively narrow frequency resource, so that receive power on a single resource can be improved, and a receive signal to noise ratio on the single resource can be improved; moreover, the base station determines the repetition factor or the extended sequence of the channel and increases the number of transmission subframes for receiving the channel, which prolongs the receive time, thereby increasing the receive energy of the channel and facilitating demodulation of a signal on the channel; and the communication quality is improved by using the foregoing method.

FIG. 1 is a signaling flowchart of a first embodiment of a signal transmission method according to the present invention, where the method may be implemented by any sending end device (terminal) and any receiving end device (base station), and the method may be implemented by means of hardware and/or software. In the method, a part correspondingly executed by the terminal may be integrated in the terminal, and a part correspondingly executed by the base station may be integrated in the base station. As shown in FIG. 1, the signal transmission method in this embodiment may include:

Step 101: The base station determines a frequency resource of a channel.

Specifically, the base station may determine the frequency resource of the channel according to a factor such as the number of terminals existing in a cell in which the terminal is located, a distance between the terminal and the base station, or a condition of a signal transmission path from the terminal to the base station.

Specifically, if the channel is a PRACH, a frequency resource of the PRACH may be determined according to a physical resource block offset $n_{PRBoffset}^{RA}$ of the PRACH and the number of resource blocks corresponding to the PRACH. For example, it may be determined, according to the physical resource block offset $n_{PRBoffset}^{RA}$ of the PRACH, that a first physical resource block of the PRACH is $n_{PRBoffset}^{RA}$, and a bandwidth of the PRACH may be determined according to the number of the resource blocks corresponding to the PRACH.

In this manner, the number of the resource blocks corresponding to the PRACH may be an integer, and for example, may be 1, 2, or 3. That is, a minimum granularity of the frequency resource determined in this manner is one resource block (12 subcarriers).

Alternatively, a frequency resource of the PRACH may be determined according to a physical resource block offset $n_{PRBoffset}^{RA}$ of the PRACH, the number of subcarriers corresponding to the PRACH, and a subcarrier offset $n_{Subcarrieroffset}^{RA}$ of the PRACH. For example, it may be determined, according to the physical resource block offset $n_{PRBoffset}^{RA}$ of the PRACH, that a first physical resource block of the PRACH is $n_{PRBoffset}^{RA}$, a position of a first subcarrier in the first physical resource block may be determined according to the subcarrier offset $n_{Subcarrieroffset}^{RA}$ of the PRACH, and a bandwidth of the PRACH may be determined according to the number of the subcarriers corresponding to the PRACH.

In this manner, the number of the resource blocks corresponding to the PRACH may be an integer, or may be n/12, where n is an integer less than 12, and for example, may be 1, 2, or 3, or may be ¼ or ⅙. That is, a minimum granularity of the frequency resource determined in this manner is one subcarrier.

If the channel is a PRACH, a frequency resource of the PUSCH may be determined according to a resource block indication and a resource element set indication of the PUSCH. The resource element set indication of the PUSCH represents a resource element set, for example, one or more virtual subcarriers, or may represent a set of resource elements in time and frequency domains, for example, an enhanced resource block group (EREG for short) or an enhanced control channel element (ECCE for short). A virtual subcarrier is a logical number of a physical subcarrier and may vary with a timeslot number or a subframe number.

Further specifically, the resource element set indication of the PUSCH is used to determine a virtual subcarrier.

During specific implementation, for the PRACH, the number of the resource blocks may be generally preset by the terminal, and the physical resource block offset $n_{PRBoffset}^{RA}$ of the PRACH and the subcarrier offset $n_{Subcarrieroffset}^{RA}$ of the PRACH may be included in a notification message sent by the base station to the terminal, so that the terminal determines the frequency resource of the PRACH according to the notification message. For the PUSCH, the resource block indication and the resource element set indication of the PUSCH may be included in the notification message sent by the base station to the terminal, so that the terminal determines the frequency resource of the PUSCH according to the notification message.

Step 102: The base station determines a repetition factor or an extended sequence of the channel.

Specifically, the base station may determine the repetition factor or the extended sequence of the channel according to a factor such as the cell in which the terminal is located, the distance between the terminal and the base station, or the condition of the signal transmission path from the terminal to the base station.

The repetition factor refers to the number of repeated transmission times of a signal on the channel, that is, a multiple by which the number of transmission subframes of the channel is increased. For example, a PRACH with a preamble format being 2 is originally transmitted in 2 subframes, and if the repetition factor is 4, the PRACH is extended to be transmitted in 8 subframes, and a signal transmitted in added subframes is the same as an original signal transmitted in the 2 subframes. In the embodiment of the present invention, the repetition factor may be 1, which represents a case in which no extension is performed, or the repetition factor may be another integer value, which represents a case in which extension is performed.

The extended sequence is used to repetitively transmit a signal on the channel by using a numerical value in the extended sequence as a signal amplitude weight, and the number of repetition times is the number of numerical values in the extended sequence, that is, a length of the extended sequence. For example, a PRACH with a preamble format being 0 is originally transmitted in 1 subframe, and if the extended sequence is {1, −1, 1, −1}, the PRACH is extended to be transmitted in 4 subframes; after extension, phases of a first subframe and a third subframe are the same as a phase of the original signal, and amplitudes of a second subframe and a fourth subframe have a same amplitude value and an opposite phase as an amplitude of the original signal.

Step 103: The terminal determines the frequency resource of the channel.

Further specifically, for the PRACH channel, the terminal may determine the frequency resource of the PRACH according to the physical resource block offset $n_{PRBoffset}^{RA}$ of the PRACH and the number of the resource blocks corresponding to the PRACH; or determine the frequency resource of the PRACH according to the physical resource block offset $n_{PRBoffset}^{RA}$ of the PRACH, the number of the resource blocks corresponding to the PRACH, and the subcarrier offset $n_{Subcarrieroffset}^{RA}$ of the PRACH.

For the PUSCH channel, the terminal may determine the frequency resource of the PUSCH according to the resource block indication and the resource element set indication of the PUSCH.

Further, the foregoing parameter for determining the frequency resource of the channel may be obtained by the terminal by receiving the notification message sent by the base station.

Step 104: The terminal determines the repetition factor or the extended sequence of the channel.

Further specifically, in step 104, a manner for determining the repetition factor or the extended sequence of the channel by the terminal may be: determining the repetition factor or the extended sequence of the channel according to a configuration in the notification message sent by the base station.

Further, the determining a repetition factor of the channel may include:

receiving the notification message sent by the base station, where the notification message includes the repetition factor of the channel.

In addition, the repetition factor included in the notification message may be a numerical value or may be multiple numerical values, and the terminal may randomly select one from the numerical values as the repetition factor of the channel.

Alternatively, the determining an extended sequence of the channel may include:

receiving the notification message sent by the base station, where the notification message includes an extended sequence identifier; and determining the extended sequence according to the extended sequence identifier.

During specific implementation, a group of extended sequences may be agreed by the base station and the terminal in advance, and each extended sequence may correspond to one extended sequence identifier. For example, the base station may configure multiple extended sequences and an identifier of each extended sequence, and send a mapping between the extended sequences and the extended sequence identifiers to the terminal by using a system message, where the mapping may be sent to the terminal when the base station detects that the terminal is powered on or when the terminal updates a position. Meanwhile, the mapping may further include lengths of the extended sequences, for example, the extended sequences may be designed as follows: A length of each extended sequence corresponds to one extended sequence, so that the length of the extended sequence can be directly used as an extended sequence identifier; and the extended sequences may be further designed as follows: a length of one extended sequence corresponds to multiple extended sequences; in this case, the mapping may be three-dimensional, and correspondence among the extended sequence identifiers, the extended sequences, and the lengths of the extended sequences may be definite, so that the terminal can find a corresponding extended sequence and a length of the extended sequence by using an extended sequence identifier.

Further, the repetition factor or the extended sequence that is determined by the base station in step 102 may correspond to the frequency resource of the channel, and correspondingly, the notification message may include the frequency resource of the channel and the repetition factor or the extended sequence identifier that corresponds to the frequency resource.

Step 105: The terminal determines a time domain resource according to the repetition factor or the length of the extended sequence, where the time domain resource is a transmission subframe.

The length of the extended sequence is the number of numerical values in the extended sequence, for example, if the extended sequence is {1, 1, 2}, the extended sequence includes 3 numerical values, that is, the length of the extended sequence is 3.

Specifically, if the number of original transmission subframes of the channel is 2, and the repetition factor is 4, or the length of the extended sequence is 4, that is, the extended sequence includes 4 numerical values, the number of transmission subframes of the channel is 8 after extension; and then, 8 subframes are selected from a radio frame according to a preset rule as transmission subframes, where the preset rule may also be agreed by the base station and the terminal in advance, and which preset rule is specifically to be used will be described in a subsequent embodiment for a specific channel.

Step 106: The terminal sends a signal by using the transmission subframe of the channel.

Step 107: The base station determines the time domain resource according to the repetition factor or the length of the extended sequence, where the time domain resource is a transmission subframe.

Step 108: The base station receives the signal by using the transmission subframe of the channel.

In step 105 to step 108, step 105 and step 106, and step 107 and step 108 above are two groups of steps concurrently executed by the terminal and the base station, where execution of step 105 and step 107 may not be strictly synchronous in terms of absolute time, while step 106 and step 108 need to be synchronously executed in terms of absolute time.

In this embodiment, the terminal increases the number of transmission subframes of the channel according to the repetition factor or the length of the extended sequence, which prolongs transmit time, thereby increasing transmit energy of the channel and extending the coverage of the channel; the base station increases the number of transmission subframes for receiving the channel, which prolongs receive time, thereby increasing receive energy of the channel, facilitating demodulation of a signal on the channel, and improving communication quality.

In the foregoing embodiment, the channel may be the physical random access channel PRACH or the physical uplink shared channel PUSCH.

Further, in the foregoing embodiment, further, the extended sequence may be a Walsh sequence.

Figure 2:
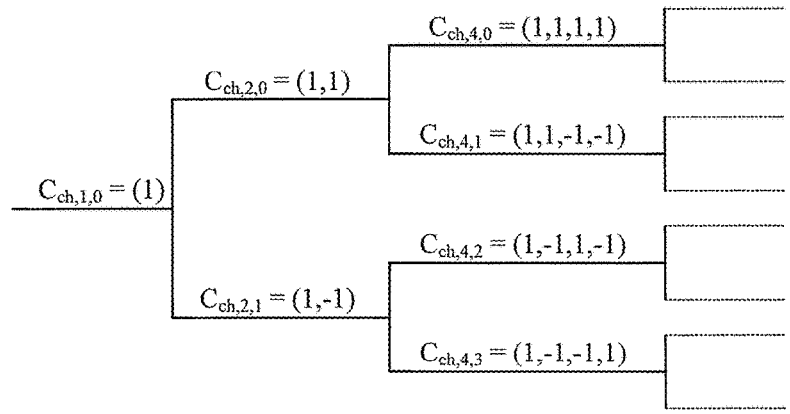
FIG. 2 is a schematic diagram of a rule of Walsh sequences.

The Walsh sequence is an orthogonal sequence, and sequences have desirable orthogonality. FIG. 2 is a schematic diagram of a rule of Walsh sequences. In FIG. 2, C represents a Walsh sequence, a subscript of C represents an extended factor, a second position in the extended factor represents a length of the sequence, and a third position in the subscript of C represents a sequence number of a Walsh sequence with a same length, for example, $C_{ch,1,0}$ represents a first Walsh sequence with a length being 1, and $C_{ch,4,1}$ represents a second Walsh sequence with a length being 4. As shown in FIG. 2, a length of a Walsh sequence may be 1, 2, 4, or $2^n$, where n is an integer; and the number of Walsh sequences with a length being N is N.

Alternatively, the extended sequence may be a sequence generated from a pseudo-noise (Pseudo-Noise, PN for short) sequence.

The PN sequence is a pseudo random sequence such as c(n) in the following formula (1):

$$c(n)=(x_1(n+N_C)+x_2(n+N_C)) \bmod 2 \quad (1)$$

where $N_C$ is an integer, and a first group of sequences $x_1$ and a second group of sequences $x_2$ meet the following conditions:

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

The extended sequence may be a sequence generated by separately initializing the first group of sequences $x_1$ and the second group of sequences $x_1$ in the foregoing PN sequence.

Further, the extended sequence being a sequence generated from a PN sequence may specifically include:

assuming that $N_C$=1600, initializing the first group of sequences $x_1$ as $x_1(0)$=1, $x_1(n)$=0, n=1, 2, . . . , 30, and initializing the second group of sequences $x_1$ as $c_{init}\Sigma_{i=0}^{30} x(i) \cdot 2^i$ by using an initialization parameter $c_{init}$, and then, substituting $x_1$ and $x_2$ into the formula (1), so as to obtain:

$$r(m) = \frac{1}{\sqrt{2}}(1 - 2 \cdot c(2m)) + j\frac{1}{\sqrt{2}}(1 - 2 \cdot c(2m+1)), \quad (2)$$

$$m = 0, 1, \ldots, N_{Repetition} - 1$$

The sequence r(m) obtained according to the formula (2) can be used as the extended sequence.

$N_{Repetition}$ is a repetition factor and is an integer value, and a value thereof may be 1 in the case of no repetition, m is an intermediate parameter, the initialization parameter $c_{init}$ may use a numerical value determined according to a cell identifier $N_{ID}^{cell}$ and/or a radio network temporary identifier $n_{RNTI}$ of the cell in which the terminal is located. For example, $c_{init}$ may be determined by using the formula (3) or (4):

$$c_{init}=N_{ID}^{cell} \quad (3)$$

or $$c_{init}=2^{16} \cdot N_{ID}^{cell}+n_{RNTI} \quad (4)$$

Further, the initialization parameter $c_{init}$ may further use a numerical value determined according to the extended sequence identifier, and the cell identifier $N_{ID}^{cell}$ and/or the radio network temporary identifier $n_{RNTI}$ of the cell in which the terminal is located. For example, $c_{init}$ may be determined by using the formula (5) or (6):

$$c_{init}=2^y \cdot n_{sequence}+2^z \cdot N_{ID}^{cell} \quad (5)$$

$$c_{init}=2^y \cdot n_{sequence}+2^z \cdot N_{ID}^{cell}+n_{RNTI} \quad (6)$$

where $n_{sequence}$ is an extended sequence identifier, and x, y, and z are preset integer values.

The following describes the technical solutions of the signal transmission method in the present invention in detail by using several specific embodiments.

In a second embodiment of a signal transmission method in the present invention, based on the foregoing embodiment, a specific method for determining the repetition factor or the extended sequence by the terminal is introduced by using the PRACH channel as an example. In this embodiment, the repetition factor or the extended sequence is determined by the base station, and the terminal determines the repetition factor or the extended sequence by receiving a notification message that is sent by the base station and includes the repetition factor or the extended sequence identifier.

Further, the notification message further includes the physical resource block offset $n_{PRBoffset}^{RA}$ and the subcarrier offset $n_{Subcarrieroffset}^{RA}$ of the PRACH, so that the terminal determines the frequency resource corresponding to the PRACH.

Further, the frequency resource of the channel included in the notification message corresponds to at least one repetition factor or at least one extended sequence identifier.

Specifically, the notification message may be a system information block (System Information Block, SIB for short) message and/or a downlink control information (Downlink Control Information, DCI for short) message. The PRACH is classified into a contention-based PRACH and a non-contention-based PRACH. Generally, for the non-contention-based PRACH, the DCI message needs to be used as the notification message.

Further preferably, if the notification message is the SIB message, information of the frequency resource of the PRACH or a repetition factor or an extended sequence identifier of the PRACH is located in a physical random access channel configuration information PRACH-ConfigInfo field of the SIB message or a physical random access channel machine type communication configuration information PRACH-ConfigInfoMTC field. The repetition factor may correspond to the frequency resource; therefore, the PRACH-ConfigInfo field or the PRACH-ConfigInfoMTC field may include both information of the frequency resource and information of the repetition factor corresponding to the frequency resource. The extended sequence may also correspond to the frequency resource; therefore, the PRACH-ConfigInfo field or the PRACH-ConfigInfoMTC field may include both the information of the frequency resource and the extended sequence identifier corresponding to the frequency resource.

Further preferably, if the notification message is the DCI message, information of the frequency resource of the PRACH or a repetition factor or an extended sequence identifier of the PRACH is located in an extended field of the DCI message, or a repetition factor or an extended sequence identifier of the PRACH is indicated through joint coding with a preamble index (Preamble Index) of the PRACH or joint coding of a mask index of the PRACH (PRACH Mask Index) in the DCI message.

Further preferably, the receiving, by the terminal, the notification message that is sent by the base station and includes the repetition factor or the extended sequence identifier may include:

Step 1: Receive an SIB message, where the SIB message includes information of a group of frequency resources of the PRACH or a group of repetition factors of the PRACH or a group of extended sequence identifiers.

Step 2: Receive a DCI message, where the DCI message includes information of one frequency resource in the group of frequency resources of the PRACH or one repetition factor in the group of repetition factors of the PRACH or one extended sequence identifier in the group of extended sequence identifiers.

In the foregoing types of notification messages, the information of the frequency resource or the repetition factor or the extended sequence identifier of the channel may also be located in another field, or may be indicated in another manner, or a message of another type may be used as the notification message, which is not limited in the embodiment of the present invention.

In this embodiment, for the PRACH channel, the terminal obtains the repetition factor or an extended code of the PRACH channel by receiving an SIB message or a DCI message that is sent by the base station and includes the repetition factor or an extended code identifier.

In a third embodiment of a signal transmission method in the present invention, based on the foregoing embodiments, a specific method for determining the repetition factor or the extended sequence by the terminal is introduced by using the PUSCH channel as an example. In this embodiment, the repetition factor or the extended sequence is determined by the base station, and the terminal determines the repetition factor or the extended sequence by receiving a notification message that is sent by the base station and includes the repetition factor or the extended sequence identifier.

Further, the notification message further includes the resource block indication and the resource element set indication of the PUSCH.

Specifically, the notification message may be a radio resource control (Radio Resource Control, RRC for short) message or a DCI message.

Further preferably, if the notification message is the RRC message, information of the frequency resource of the PUSCH or a repetition factor or an extended sequence identifier of the PUSCH may be located in a physical uplink shared channel configuration PUSCH-Config field of the RRC message or located in a physical uplink shared channel dedicated configuration PUSCH-ConfigDedicated field. The repetition factor may correspond to the frequency resource; therefore, the PUSCH-Config field or the PUSCH-ConfigDedicated field may include both information of the frequency resource and information of the repetition factor corresponding to the frequency resource. The extended sequence may also correspond to the frequency resource; therefore, the PUSCH-Config field or the PUSCH-ConfigDedicated field may include both the information of the frequency resource and the extended sequence identifier corresponding to the frequency resource.

Further preferably, if the notification message is the DCI message, information of the frequency resource of the PUSCH or a repetition factor or an extended sequence identifier of the PUSCH may be located in an extended field of the DCI message, or the resource element set indication of the PUSCH or a repetition factor or an extended sequence identifier of the PUSCH may be indicated through joint coding with resource block indication information of the PUSCH in the DCI message.

Further preferably, the receiving, by the terminal, a notification message sent by the base station may include:

Step 1: Receive an RRC message, where the RRC message includes information of a group of frequency resources of the PUSCH or repetition factors of the PUSCH or extended sequence identifiers.

Step 2: Receive a DCI message, where the DCI message includes information of one frequency resource in the information of the group of frequency resources of the PUSCH or one repetition factor in the group of repetition factors of the PUSCH or one extended sequence identifier in the group of extended sequence identifiers.

In the foregoing types of notification messages, the repetition factor or the extended sequence identifier of the channel may also be located in another field, or may be indicated in another manner, or a message of another type may be used as the notification message, which is not limited in the embodiment of the present invention.

In this embodiment, for the PUSCH channel, the terminal obtains the repetition factor or an extended code of the PUSCH channel by receiving an RRC message or a DCI message that is sent by the base station and includes the repetition factor or an extended code identifier.

Figure 3:
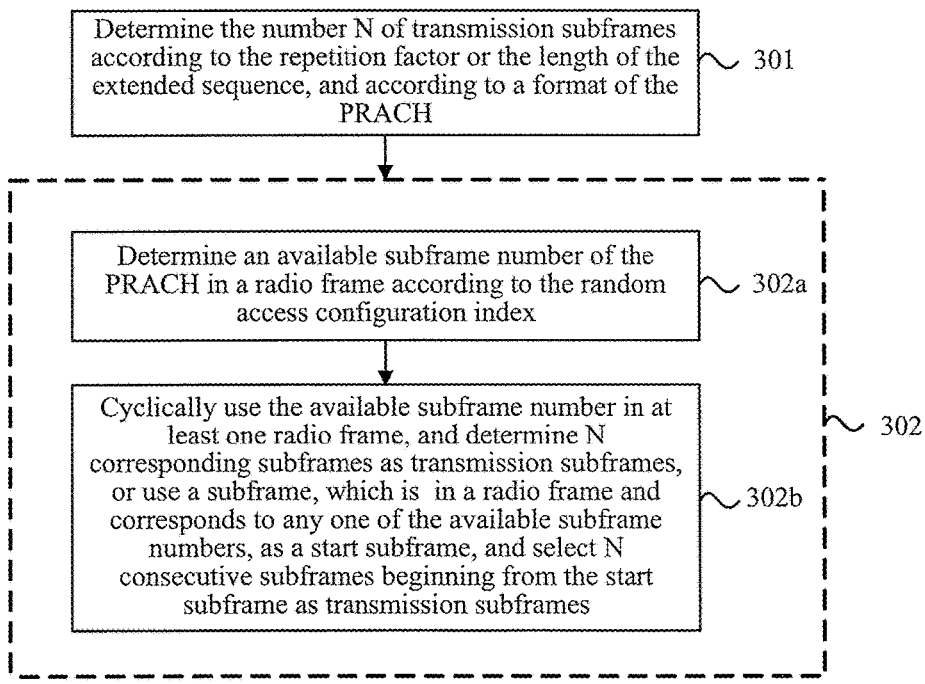
FIG. 3 is a flowchart of a fourth embodiment of a signal transmission method according to the present invention.

FIG. 3 is a flowchart of a fourth embodiment of a signal transmission method according to the present invention. Based on the foregoing embodiments, for the PRACH channel, this embodiment further provides a specific method for determining the transmission subframe according to the repetition factor or the length of the extended sequence by the terminal. This embodiment is executed by the terminal. As shown in FIG. 2, the method for determining the transmission subframe in this embodiment may include:

Step 301: Determine the number N of transmission subframes according to the repetition factor or the length of the extended sequence, and according to a format of the PRACH.

Specifically, for a PRACH with a format of 0 or 1, the number of transmission subframes thereof is 1; and for a PRACH with a format of 2 or 3, the number of transmission subframes thereof is 2. If the repetition factor is 4, or the length of the extended sequence is 4, the number of the transmission subframes is 4 after the PRACH with the format of 0 or 1 is extended, while the number of the transmission subframes is 8 after the PRACH with the format of 2 or 3 is extended.

Step 302: Determine a transmission subframe according to a random access configuration index and the number N of transmission subframes.

A numerical value of the random access configuration index may be randomly generated by the terminal, or may be preconfigured by the base station and delivered to the terminal by using an SIB message, a DCI message, or in another manner.

Further, step 302 may specifically include:

Step 302*a*: Determine an available subframe number of the PRACH in a radio frame according to the random access configuration index.

Step 302*b*: Cyclically use the available subframe number in at least one radio frame, and determine N corresponding subframes as transmission subframes, or use a subframe, which is in a radio frame and corresponds to any one of the available subframe numbers, as a start subframe, and select N consecutive subframes beginning from the start subframe as transmission subframes.

The following specifically describes the method for determining the transmission subframe with reference to a specific random access configuration table, and both the terminal and the base station can store the random access configuration table.

Table 1 is a random access configuration table of preamble formats 0 to 3; in Table 1, the first column is PRACH configuration indexes, and the second, third, and fourth columns are preamble formats, system frame numbers, and subframe numbers that correspond to the PRACH configuration indexes.

Step 302*a* may specifically be as follows: A preamble format, that is, a preamble format "Preamble Format" in the fourth column, and a possible start subframe of the PRACH, that is, a subframe number "Subframe number" in the fourth column may be determined according to the numerical value of the random access configuration index, thereby determining the number of subframes in a PRACH transmission. For example, if the random access configuration index is 41, a preamble format thereof is 2, and the number of subframes before extension is 2; subframes with subframe numbers of {1, 4, 7} in the radio frame may be selected as the start subframes of the PRACH.

If the repetition factor or the length of the extended sequence is 8, the number of the subframes of the extended PRACH determined according to step 301 is 16. A UE randomly selects, or selects, according to an instruction of the base station, an optional subframe for PRACH transmission. Correspondingly, for step 302*b*, the available subframe number may be cyclically used to determine N corresponding subframes as the transmission subframes; when the method of step 302 is applied to the foregoing example, such 8 subframes as {1, 4, 7, 1, 4, 7, 1, 4} may be selected as start subframes; a PRACH with a preamble format being 2 needs two subframes; therefore, 16 subframes actually used by the PRACH may be {1, 2; 4, 5; 7, 8; 1, 2; 4, 5; 7, 8; 1, 2; 4, 5}. Alternatively, a subframe, in the radio frame, corresponding to any one of the available subframe numbers may be used as the start subframe, and N consecutive subframes beginning from the start subframe are selected as the transmission subframes; corresponding to the foregoing example, such 16 subframes as {1, 2, 3, 4, 5, 6, 7, 8, 9, 0, 1, 2, 3, 4, 5, 6}, {4, 5, 6, 7, 8, 9, 0, 1, 2, 3, 4, 5, 6, 7, 8, 9}, or {7, 8, 9, 0, 1, 2, 3, 4, 5, 6, 7, 8, 9, 0, 1, 2} may be selected.

TABLE 1

Random Access Configuration Table of Preamble formats 0 to 3

| PRACH configuration index PRACH Configuration Index | Preamble format Preamble Format | System frame number System frame number | Subframe number Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

In this embodiment, the number of transmission subframes is determined according to the repetition factor or the length of the extended sequence, and according to the format of the PRACH, and the transmission subframe after the channel is extended is determined with reference to a part or all of the random access configuration table and according to the random access configuration index.

It should be noted that, the method for determining the transmission subframe provided by a fourth embodiment is a preferred method, and the transmission subframe may be determined by using another method, which is not limited in the embodiment of the present invention.

Figure 4:
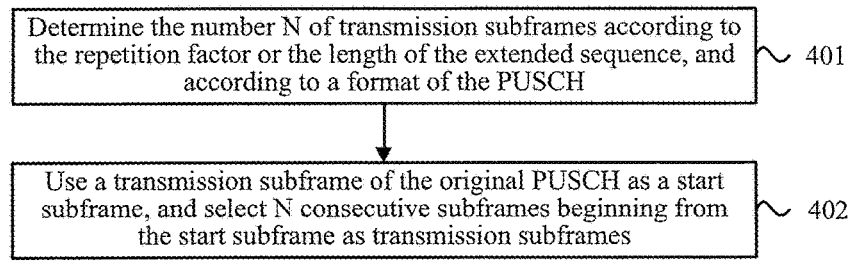
FIG. 4 is a flowchart of a fifth embodiment of a signal transmission method according to the present invention.

FIG. 4 is a flowchart of a fifth embodiment of a signal transmission method according to the present invention. Based on the foregoing embodiments, for the PUSCH channel, this embodiment further provides a specific method for determining the transmission subframe according to the repetition factor or the length of the extended sequence by the terminal. This embodiment is executed by the terminal. As shown in FIG. 4, the method for determining the transmission subframe in this embodiment may include:

Step 401: Determine the number N of transmission subframes according to the repetition factor or the length of the extended sequence, and according to a format of the PUSCH.

Step 402: Use a transmission subframe of the original PUSCH as a start subframe, and select N consecutive subframes beginning from the start subframe as transmission subframes.

The PUSCH has only one transmission subframe before extension; therefore, the original transmission subframe of the PUSCH may be directly used as the start subframe.

Specifically, if the number of transmission subframes determined in step 401 is 4, and the transmission subframe of the PUSCH before extension is a subframe 2, such 4 subframes as {2, 3, 4, 5} may be selected after extension.

In this embodiment, the number of transmission subframes is determined according to the repetition factor or the length of the extended sequence, and according to the format of the PUSCH, and N consecutive subframes beginning from the original subframe are selected as the transmission subframes after extension.

It should be noted that, the method for determining the transmission subframe provided by Embodiment 4 is a preferred method, and the transmission subframe may be determined by using another method, which is not limited in the embodiment of the present invention.

Figure 5:
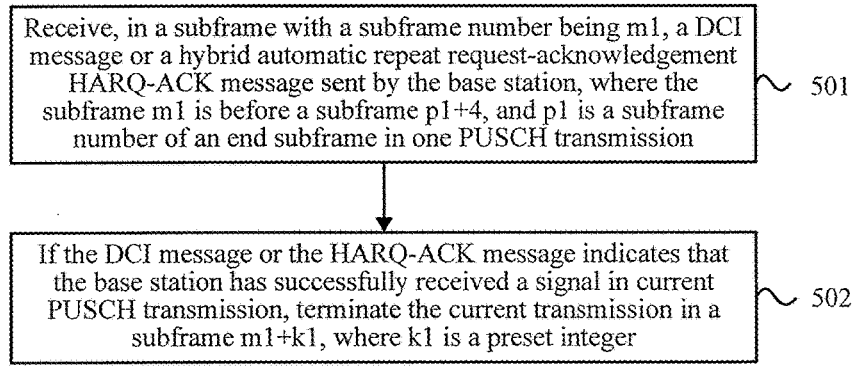
FIG. 5 is a flowchart of a sixth embodiment of a signal transmission method according to the present invention.

FIG. 5 is a flowchart of a sixth embodiment of a signal transmission method according to the present invention. Based on the foregoing embodiments, for the PUSCH channel, this embodiment further provides a specific method for sending a signal in the transmission subframe by the terminal. This embodiment is executed by the terminal. As shown in FIG. 4, the method for sending a signal in the transmission subframe in this embodiment may include:

Step 501: Receive, in a subframe with a subframe number being m1, a DCI message or a hybrid automatic repeat request-acknowledgment HARQ-ACK message sent by the base station, where the subframe m1 is before a subframe p1+4, and p1 is a subframe number of an end subframe in one PUSCH transmission.

Step 502: If the DCI message or the HARQ-ACK message indicates that the base station has successfully received a signal in current PUSCH transmission, terminate the current transmission in a subframe m1+k1, where k1 is a preset integer.

Specifically, k1 may be set, for example, to 3; the setup of k1 may be used for the terminal to analyze the DCI message or the HARQ-ACK message during k1 subframes after the terminal receives the DCI message or the HARQ-ACK message, so as to determine whether the DCI message or the HARQ-ACK message indicates that the base station has successfully received the signal in the current PUSCH transmission.

If the DCI message or HARQ-ACK message does not indicate that the base station has successfully received the signal in the current PUSCH transmission, for example, the DCI message or the HARQ-ACK message received by the terminal is a response message for another channel or for transmission other than the current PUSCH transmission, the terminal may not perform any processing on the current PUSCH and still sends the signal in the transmission subframe determined, for example, in step 302 in the foregoing embodiment.

In the prior art, the DCI message or the hybrid automatic repeat request-acknowledgment HARQ-ACK message sent by the base station is generally received in the subframe p1+4 or in a subframe after the subframe p1+4, that is, the DCI message or the hybrid automatic repeat request-acknowledgment HARQ-ACK message sent by the base station is received at least 4 milliseconds (4 subframes) after the completion of one PUSCH transmission. As a result, even if the base station successfully receives, before the PUSCH transmission is completed, the signal sent by the terminal, the base station still continues to receive a repeated signal, which leads to a longer signal transmission time and a waste of transmission resources. For example, the number of subframes in one PUSCH transmission is 8, it is possible that the base station successfully receives, in a $4^{th}$ subframe, the signal sent by the terminal; however, in a solution in the prior art, the terminal does not start receiving a response message sent by the base station until at least the twelfth subframe, that is, transmission in 8 subframes after the fourth subframe is actually unnecessary.

In this embodiment, a moment of receiving the DCI message or the hybrid automatic repeat request-acknowledgment HARQ-ACK message is advanced before the subframe p1+4; and if the DCI message or the HARQ-ACK message indicates that the base station has successfully received the signal in the current PUSCH transmission, the terminal may terminate the current PUSCH transmission ahead of time, so that transmission resources can be saved.

Figure 6:
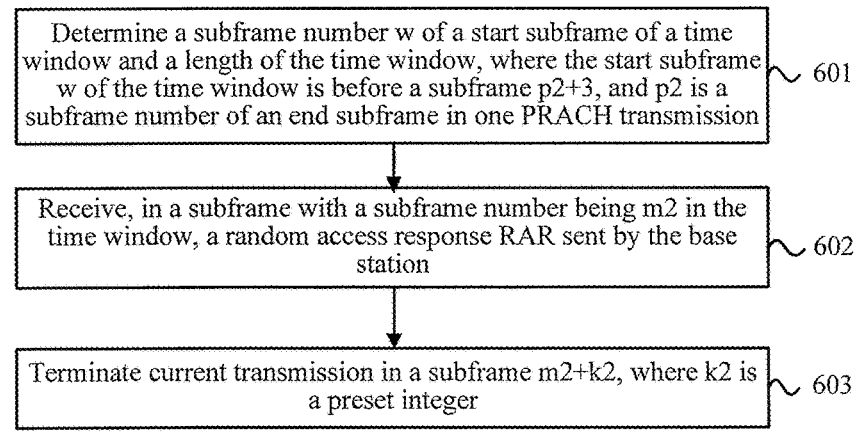
FIG. 6 is a flowchart of a seventh embodiment of a signal transmission method according to the present invention.

FIG. 6 is a flowchart of a seventh embodiment of a signal transmission method according to the present invention. Based on the foregoing embodiments, for the PRACH channel, this embodiment further provides a specific method for sending a signal in the transmission subframe by the terminal. This embodiment is executed by the terminal. As shown in FIG. 5, the method for sending a signal in the transmission subframe in this embodiment may include:

Step 601: Determine a subframe number w of a start subframe of a time window and a length of the time window, where the start subframe w of the time window is before a subframe p2+3, and p2 is a subframe number of an end subframe in one PRACH transmission.

Further specifically, the start subframe w of the time window may be determined according to that w=p2−t1 or w=n2+t2, where t1 and t2 are preset integers, and n2 is a subframe number of a start subframe in one PRACH transmission. For example, if subframes in one PRACH transmission are Subframe numbers of the subframes in one PRACH transmission may be inconsecutive integers, for example, {7, 8, 9, 0, 1, 2, 3, 4}, and a numerical value of t1 or t2 needs to adapt to subframes used for the current PRACH transmission, so that the start subframe w of the time window is located within the subframes used for the current PRACH transmission and 3 subframes after the end subframe of the current PRACH transmission, so as to achieve the objective of saving transmission resources.

Step 602: Receive, in a subframe with a subframe number being m2 in the time window, a random access response RAR sent by the base station.

Step 603: Terminate current transmission in a subframe m2+k2, where k2 is a preset integer.

Specifically, k2 may be set, for example, to 3; k2 is set so that the terminal can analyze the RAR during k2 subframes after the terminal receives the RAR, so as to determine whether the RAR is a response to the current PRACH transmission and whether the RAR indicates that the base station has successfully received a signal in the current PRACH transmission.

In this embodiment, a difference between step 601 and the prior art lies in that, the start subframe of the time window is set after p2+3 in the prior art, while the start subframe of the time window is set before p2+3 in step 601 in this embodiment. In the prior art, a time window for receiving a response message sent by the base station is not enabled until 3 milliseconds (3 subframes) after the completion of the PRACH transmission. As a result, even if a receiving end, that is, the base station, successfully receives, before the PRACH transmission is completed, a signal sent by a sending end, that is, a terminal device, the receiving end still continues to receive a repeated signal, which leads to a longer signal transmission time and a waste of the transmission resources.

In this embodiment, the time window for receiving the RAR is advanced, and the current PRACH transmission is terminated ahead of time after the terminal determines that the base station has successfully received the signal in the current PRACH transmission, so that transmission resources can be saved.

Figure 7:
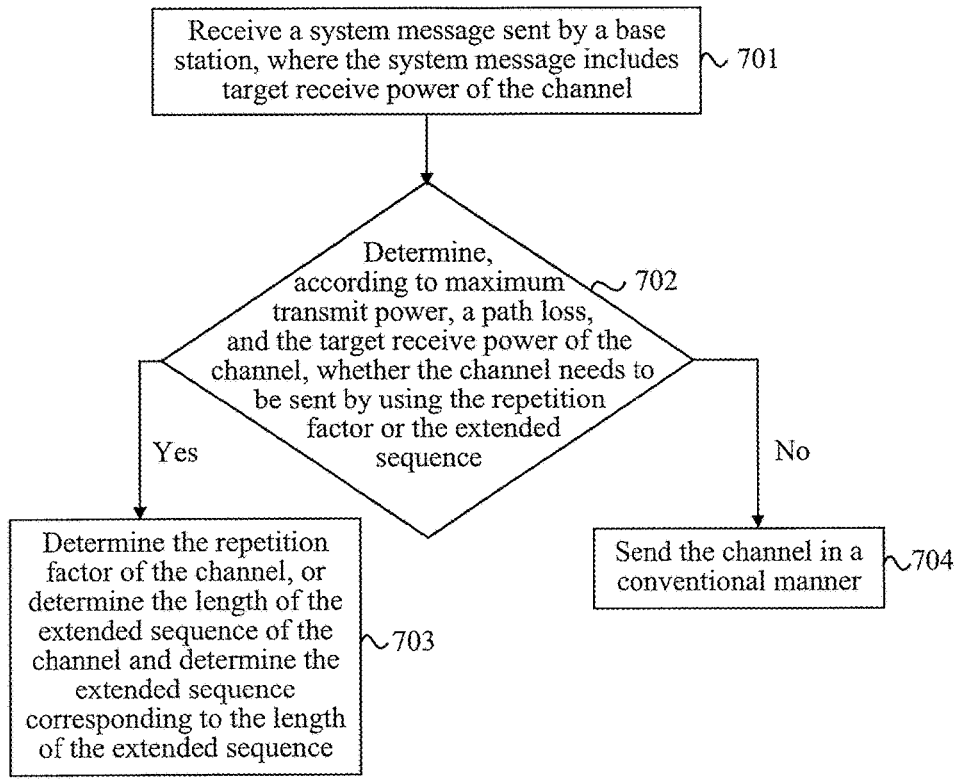
FIG. 7 is a flowchart of an eighth embodiment of a signal transmission method according to the present invention.

FIG. 7 is a flowchart of an eighth embodiment of a signal transmission method according to the present invention. Based on any one of the foregoing embodiments, this embodiment further introduces a method for selecting the repetition factor or the extended sequence before the terminal sends the signal. This embodiment is executed by the terminal. In this embodiment, the terminal may obtain various possible repetition factors or extended sequences from the notification message sent by the base station, and before sending the signal, the terminal may perform calculation or estimation by using a certain algorithm, so as to determine whether the signal needs to be sent by using the repetition factor or the extended sequence. As shown in FIG. 6, the method in this embodiment may include:

Step 701: Receive a system message sent by the base station, where the system message includes target receive power of the channel.

Step 702: Determine, according to maximum transmit power, a path loss, and the target receive power of the channel, whether the channel needs to be sent by using the repetition factor or the extended sequence.

If yes, step 703 is executed, and if not, step 704 is executed.

Step 703: Determine the repetition factor of the channel, or determine the length of the extended sequence of the channel and determine the extended sequence corresponding to the length of the extended sequence.

Specifically, the repetition factor of the channel may be one or more numerical values agreed by the terminal and the base station in advance, and the extended sequence of channel may also be one or more sequences agreed by the terminal and the base station in advance, where lengths of multiple sequences may be different. During specific implementation, the one or more repetition factors or the one or more extended sequences may be specified by using the system message in step 701, or may be specified by using any one of the notification messages in a third embodiment and Embodiment 4, or may be specified in another manner, which is not limited in the present invention.

Correspondingly, step 703 may be selecting one from one or more specified repetition factors, or selecting one from one or more extended sequences.

Further specifically, the determining the repetition factor of the channel or determining the length of the extended sequence of the channel in step 703 may include:

according to the maximum transmit power, the path loss, and the target receive power of the channel, determining the repetition factor of the channel, or determining the length of the extended sequence and then selecting an extended sequence according to the length of the extended sequence. For example, the maximum transmit power of the terminal is 23 dB, the path loss is 100 dB, and the target receive power of the channel is −60 dB; in this case, a power difference of 13 dB exists in each subframe received by the base station, and it may be obtained, according to a theory of wireless communications and an empirical formula, that the receiving end can successfully receive the signal by repeating transmission for 20 times; therefore, the repetition factor or the length of the extended sequence may be set to 20.

Step 704: Send the channel in a conventional manner.

In the foregoing example, if the maximum transmit power of the terminal is greater than or equal to 40 dB, the repetition factor or the extended sequence may be not used to extend the channel, and the signal on the channel is sent in the conventional manner.

In this embodiment, before sending the signal, the terminal first determines whether the channel needs to be extended by using the repetition factor or the extended sequence, and can select a most suitable repetition factor or extended sequence through calculation, so that the terminal can use the transmission resources more reasonably.

In the foregoing embodiment, correspondingly, before receiving, the base station cannot know whether the terminal uses the repetition factor or the extended sequence, and cannot know which repetition factor or extended sequence is selected by the terminal; therefore, the receiving needs to be performed simultaneously in transmission subframes determined according to all possible repetition factors or extended sequences.

The following introduces a method correspondingly executed by the base station in a first embodiment of the signal transmission method provided by the present invention, and the method includes:

determining a frequency resource of a channel;

determining a repetition factor or an extended sequence of the channel;

determining a time domain resource according to the repetition factor or a length of the extended sequence, where the time domain resource is a transmission subframe; and receiving a signal by using the frequency resource and the transmission subframe of the channel.

In a ninth embodiment of a signal transmission method in the present invention, a method of how the base station notifies a terminal after determining the repetition factor or the extended sequence is added. In this embodiment, the base station delivers information of the determined repetition factor or extended sequence by sending a notification message to the terminal. Specifically, the notification message includes the repetition factor or the extended sequence identifier of the channel, so as to instruct the terminal to determine, according to the notification message, the repetition factor or the extended sequence of the channel.

Further specifically, the repetition factor or the extended sequence may correspond to the frequency resource of the channel; therefore, the notification message may include the frequency resource of the channel and the repetition factor or the extended sequence identifier that corresponds to the frequency resource.

In a tenth embodiment of a signal transmission method in the present invention, further specifically, a specific form of the notification message is introduced by using a PRACH channel as an example. For the PRACH channel, the notification message may be an SIB message or a DCI message. The PRACH is classified into a contention-based PRACH and a non-contention-based PRACH. Generally, for the non-contention-based PRACH, the DCI message needs to be used as the notification message.

Further preferably, if the notification message is the SIB message, information of a frequency resource of the PRACH or a repetition factor or an extended sequence identifier of the PRACH may be located in a PRACH-ConfigInfo field or a PRACH-ConfigInfoMTC field of the SIB message. The repetition factor may correspond to the frequency resource; therefore, the PRACH-ConfigInfo field or the PRACH-ConfigInfoMTC field may include both information of the frequency resource and information of the repetition factor corresponding to the frequency resource. The extended sequence may also correspond to the frequency resource; therefore, the PRACH-ConfigInfo field or the PRACH-ConfigInfoMTC field may include both the information of the frequency resource and the extended sequence identifier corresponding to the frequency resource.

Further preferably, if the notification message is the DCI message, information of the frequency resource of the PRACH or a repetition factor or an extended sequence identifier of the PRACH is located in an extended field of the DCI message; or a repetition factor or an extended sequence identifier of the PRACH is indicated through joint coding with a preamble index (Preamble Index) of the PRACH or joint coding of a mask index of the PRACH (PRACH Mask Index) in the DCI message.

Further preferably, the sending, by the base station, a notification message to the terminal may include:

Step 1: Send an SIB message to the terminal, where the SIB message includes information of a group of frequency resources of the PRACH or a group of repetition factors of the PRACH or a group of extended sequence identifiers.

Step 2: Send a DCI message to the terminal, where the DCI message includes information of one frequency resource in the information of the group of frequency resources of the PRACH or one repetition factor in the group of repetition factors of the PRACH or one extended sequence identifier in the group of extended sequence identifiers.

In the foregoing types of notification messages, the repetition factor or the extended sequence identifier of the channel may also be located in another field, or may be indicated in another manner, or a message of another type may be used as the notification message, which is not limited in the embodiment of the present invention.

In this embodiment, for the PRACH channel, the base station notifies the terminal of the repetition factor or an extended code of the PRACH channel by using an SIB message or a DCI message that is sent to the terminal and includes the repetition factor or an extended code identifier.

In an eleventh embodiment of a signal transmission method in the present invention, based on the foregoing embodiments, a specific method for notifying the terminal of the repetition factor or the extended sequence by the base station is introduced by using a PUSCH channel as an example.

Specifically, for the PUSCH channel, the notification message may be a radio resource control (Radio Resource Control, RRC for short) message or a DCI message.

Further preferably, if the notification message is the RRC message, information of the frequency resource of the PUSCH or a repetition factor or an extended sequence identifier of the PUSCH may be located in a physical uplink shared channel configuration PUSCH-Config field of the RRC message or located in a physical uplink shared channel dedicated configuration PUSCH-ConfigDedicated field. The repetition factor may correspond to the frequency resource; therefore, the PUSCH-Config field or the PUSCH-ConfigDedicated field may include both information of the frequency resource and information of the repetition factor corresponding to the frequency resource. The extended sequence may also correspond to the frequency resource; therefore, the PUSCH-Config field or the PUSCH-ConfigDedicated field may include both the information of the frequency resource and the extended sequence identifier corresponding to the frequency resource.

Further preferably, if the notification message is the DCI message, information of the frequency resource of the PUSCH or a repetition factor or an extended sequence identifier of the PUSCH is located in an extended field of the DCI message, or a resource element set indication of the PUSCH or a repetition factor or an extended sequence identifier of the PUSCH may be indicated through joint coding with resource block indication information of the PUSCH in the DCI message.

Further preferably, the sending a notification message to the terminal may include:

Step 1: Send an RRC message to the terminal, where the RRC message includes information of a group of frequency resources of the PUSCH or a group of repetition factors of the PUSCH or a group of extended sequence identifiers.

Step 2: Send a DCI message to the terminal, where the DCI message includes information of one frequency resource in the information of the group of frequency resources of the PUSCH or one repetition factor in the group of repetition factors of the PUSCH or one extended sequence identifier in the group of extended sequence identifiers.

In the foregoing types of notification messages, the repetition factor or the extended sequence identifier of the channel may also be located in another field, or may be indicated in another manner, or a message of another type may be used as the notification message, which is not limited in the embodiment of the present invention.

In this embodiment, for the PUSCH channel, the base station notifies the terminal of the repetition factor or an extended code of the PUSCH channel by using an RRC message or a DCI message that is sent to the terminal and includes the repetition factor or an extended code identifier.

In a twelfth embodiment of a signal transmission method in the present invention, a method for determining the transmission subframe according to the repetition factor or the length of the extended sequence by the base station is introduced for the PRACH. This embodiment is executed by the base station. In this embodiment, the method for determining the transmission subframe according to the repetition factor or the length of the extended sequence and executed by the base station may be the same as the method for determining the transmission subframe according to the repetition factor or the length of the extended sequence and executed by the terminal in a fourth embodiment of the signal transmission method in the present invention, and refer to a fourth embodiment of the signal transmission method in the present invention and the method shown in FIG. 3, which is not repeated herein.

It should be noted that, in step 302 in a fourth embodiment of the signal transmission method in the present invention, the numerical value of the random access configuration index may be randomly generated by the terminal, or may be preconfigured by the base station and delivered to the terminal by using the SIB message, the DCI message, or another manner; and in Embodiment 11, the numerical value of the random access configuration index may be configured by the base station according to a certain algorithm or randomly generated.

In a thirteenth embodiment of a signal transmission method in the present invention, a method for determining the transmission subframe according to the repetition factor or the length of the extended sequence by the base station is introduced for the PUSCH. This embodiment is executed by the base station. In this embodiment, the method, executed by the base station, for determining the transmission subframe according to the repetition factor or the length of the extended sequence may be the same as the method, executed by the terminal, for determining the transmission subframe according to the repetition factor or the length of the extended sequence in a fifth embodiment of the signal transmission method in the present invention, and refer to a fifth embodiment of the signal transmission method in the present invention and the method shown in FIG. 4, which is not repeated herein.

Figure 8:
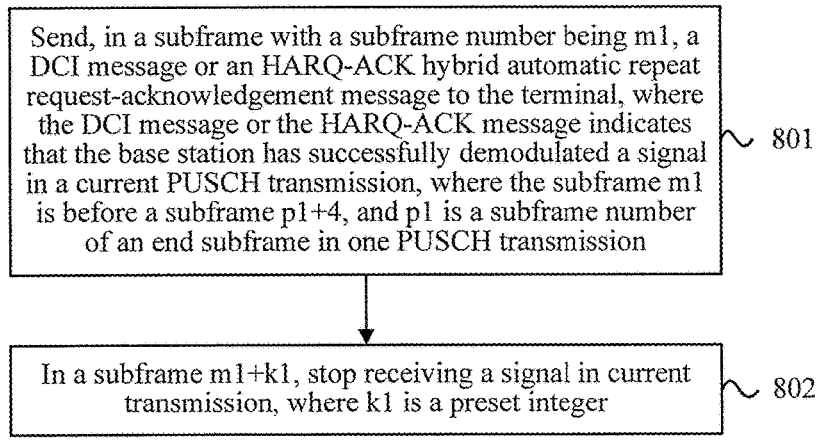
FIG. 8 is a flowchart of a fourteenth embodiment of a signal transmission method according to the present invention.

FIG. 8 is a flowchart of a fourteenth embodiment of a signal transmission method according to the present invention. Based on the foregoing embodiments, for the PUSCH channel, this embodiment further provides a specific method for sending a signal in the transmission subframe by the terminal. This embodiment is executed by the terminal. As shown in FIG. 8, the method for sending a signal in the transmission subframe in this embodiment may include:

Step 801: Send, in a subframe with a subframe number being m1, a DCI message or an HARQ-ACK hybrid automatic repeat request-acknowledgment message to the terminal, where the DCI message or the HARQ-ACK message indicates that the base station has successfully demodulated a signal in current PUSCH transmission, where the subframe m1 is before a subframe p1+4, and p1 is a subframe number of an end subframe in one PUSCH transmission.

Step 802: In a subframe m1+k1, stop receiving a signal in current transmission, where k1 is a preset integer.

Specifically, k1 may be set, for example, to 3; the setup of k1 may be used for the terminal to analyze the DCI message or the HARQ-ACK message during k1 subframes after the terminal receives the DCI message or the HARQ-ACK message, so as to determine whether the DCI message or the HARQ-ACK message indicates that the base station has successfully received the signal in the current PUSCH transmission.

In the prior art, the base station generally sends the DCI message or the HARQ-ACK message to the terminal in the subframe p1+4 or a subframe after the subframe p1+4; however, in this embodiment, a moment for sending the DCI message or the HARQ-ACK message is advanced before the subframe p1+4, so that the base station notifies the terminal in time after confirming that the signal in the current PUSCH transmission has been successfully received, to enable the terminal to terminate the transmission, and therefore, transmission resources can be saved.

Figure 9:
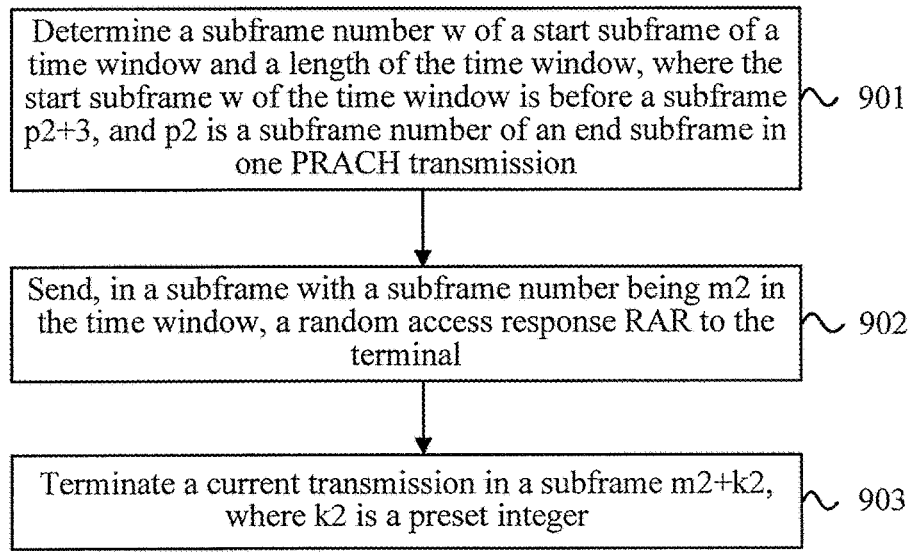
FIG. 9 is a flowchart of a fifteenth embodiment of a signal transmission method according to the present invention.

FIG. 9 is a flowchart of a fifteenth embodiment of a signal transmission method according to the present invention. Based on the foregoing embodiments, for the PRACH channel, this embodiment further provides a specific method for receiving a signal in the transmission subframe by the base station. This embodiment is executed by the base station. As shown in FIG. 9, the method in this embodiment may include:

Step 901: Determine a subframe number w of a start subframe of a time window and a length of the time window, where the start subframe w of the time window is before a subframe p2+3, and p2 is a subframe number of an end subframe in one PRACH transmission.

A difference between step 901 and the prior art lies in that, the start subframe of the time window is set after p2+3 in the prior art, while the start subframe of the time window is set before p2+3 in step 901 in this embodiment.

Further specifically, the start subframe w of the time window may be determined according to that w=p2−t1 or w=n2+t2, where t1 and t2 are preset integers, and n2 is a subframe number of a start subframe in one PRACH transmission. For example, if subframes in one PRACH transmission are Subframe numbers of the subframes in one PRACH transmission may be inconsecutive integers, for example, {7, 8, 9, 0, 1, 2, 3, 4}, and a numerical value of t1 or t2 needs to adapt to subframes used for the current PRACH transmission, so that the start subframe w of the frame time window is located within the subframes used for the current PRACH transmission and 3 subframes after the end subframe of the current PRACH transmission, so as to achieve the objective of saving transmission resources.

Step 902: Send, in a subframe with a subframe number being m2 in the time window, a random access response RAR to the terminal.

Step 903: Terminate current transmission in a subframe m2+k2, where k2 is a preset integer.

Specifically, k2 may be set, for example, to 3; k2 is set so that the terminal can analyze the RAR during k2 subframes after the terminal receives the RAR, so as to determine whether the RAR is a response to the current PRACH transmission and whether the RAR indicates that the base station has successfully received a signal in the current PRACH transmission.

In this embodiment, the time window for receiving the RAR is advanced, and the current PRACH transmission is terminated ahead of time after the terminal determines that the base station has successfully received the signal in the current PRACH transmission, so that transmission resources can be saved.

Figure 10:
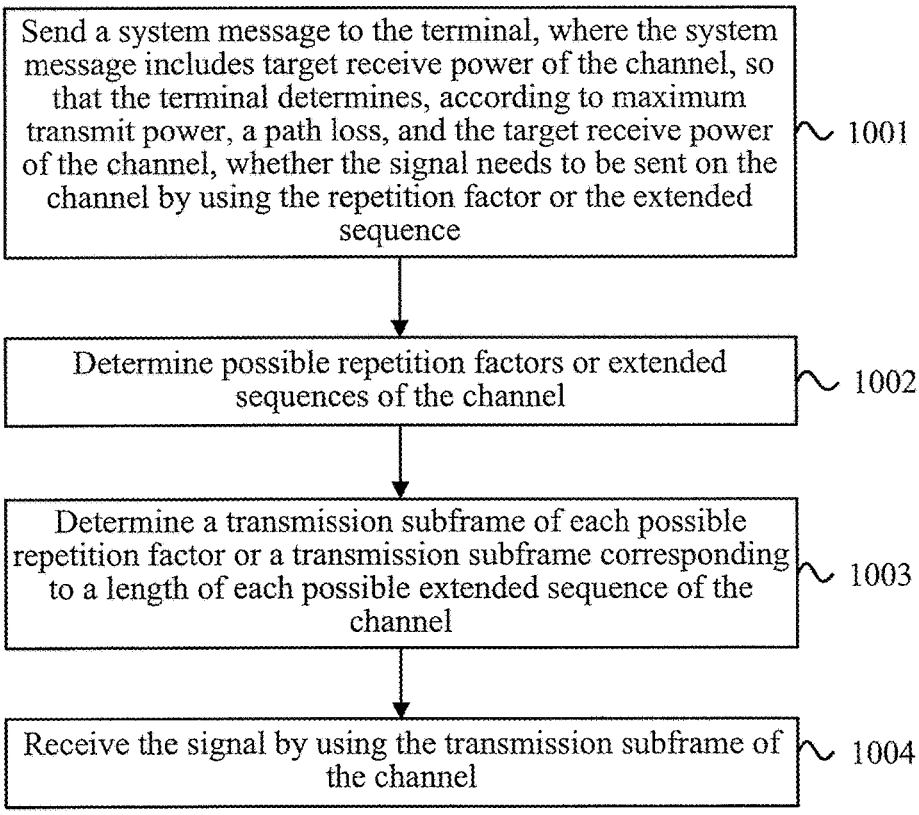
FIG. 10 is a flowchart of a sixteenth embodiment of a signal transmission method according to the present invention.

FIG. 10 is a flowchart of a sixteenth embodiment of a signal transmission method according to the present invention. This embodiment corresponds to an eighth embodiment of the method executed by the terminal. Based on any one of the foregoing method embodiments executed by the base station, a method of how the base station receives the signal that is sent by terminal on the channel is further introduced. As shown in FIG. 10, the signal transmission method in this embodiment may include:

Step 1001: Send a system message to the terminal, where the system message includes target receive power of the channel, so that the terminal determines, according to maximum transmit power, a path loss, and the target receive power of the channel, whether the signal needs to be sent on the channel by using the repetition factor or the extended sequence.

During specific implementation, one or more available repetition factors or one or more extended sequences may be agreed by the base station and the terminal in advance.

Further, the available repetition factor or an extended sequence identifier of the available extended sequence may be included in the system message, or the information may be included in any one of the notification messages in the foregoing Embodiment 9, Embodiment 10, and Embodiment 11. The available repetition factor or the available extended sequence may also be specified in another manner, which is not limited in the present invention.

Step 1002: Determine possible repetition factors or extended sequences of the channel.

Step 1003: Determine a transmission subframe of each possible repetition factor or a transmission subframe corresponding to a length of each possible extended sequence of the channel.

Step 1004: Receive the signal by using the transmission subframe of the channel.

The base station specifies at least one available repetition factor or at least one available extended sequence in advance, and sends the at least one available repetition factor or at least one available extended sequence to the terminal by using, for example, the system message in step 1001; however, before receiving the signal, the base station cannot know whether the terminal uses the repetition factor or the extended sequence, and cannot know which repetition factor or extended sequence is selected by the terminal; therefore, the signal needs to be simultaneously received on transmission subframes determined according to all possible repetition factors or extended sequences. In this manner, the base station consumes many transmission resources; therefore, during specific implementation, a limited number of available repetition factors or available extended sequences may be determined according to an actual condition.

In this embodiment, the base station sends the message including the target receive power of the channel to the terminal, so that the terminal can determine whether the channel needs to be extended by using the repetition factor or the extended sequence, and the terminal can select a suitable repetition factor or extended sequence, so that the terminal can use the transmission resources more reasonably.

Figure 11:
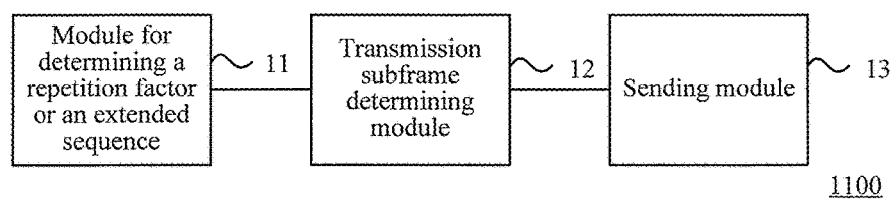
FIG. 11 is a schematic structural diagram of a first embodiment of a signal transmission apparatus according to the present invention.

FIG. 11 is a schematic structural diagram of a first embodiment of a signal transmission apparatus according to the present invention. The apparatus 1100 in this embodiment may be integrated on a terminal device, and is configured to execute the technical solutions in the foregoing method embodiments that are executed by a corresponding terminal. As shown in FIG. 11, the signal transmission apparatus in this embodiment may include: a module for determining a repetition factor or an extended sequence 11, a transmission subframe determining module 12, and a sending module 13, where the module for determining a repetition factor or an extended sequence 11 is configured to determine a repetition factor or an extended sequence of a channel;

the transmission subframe determining module 12 is configured to determine a time domain resource according to the repetition factor or a length of the extended sequence, where the time domain resource is a transmission subframe; and the sending module 13 is configured to send a signal by using the transmission subframe of the channel.

The technical effects of the apparatus in this embodiment are as follows: A terminal integrated with the signal transmission apparatus increases that number of transmission subframe of the channel by using the repetition factor or the extended sequence of the channel and according to the repetition factor or the length of the extended sequence, which prolongs transmit time, thereby increasing transmit energy of the channel and extending the coverage of the channel.

Figure 12:
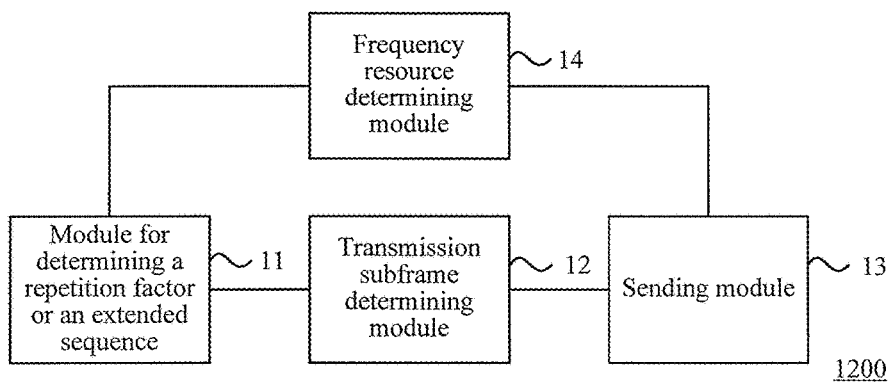
FIG. 12 is a schematic structural diagram of a second embodiment of a signal transmission apparatus according to the present invention.

FIG. 12 is a schematic structural diagram of a second embodiment of a signal transmission apparatus according to the present invention. The apparatus 1200 in this embodiment may be integrated on a terminal device, and is configured to execute the technical solutions in the foregoing method embodiments that are executed by a corresponding terminal. As shown in FIG. 12, based on the apparatus shown in FIG. 11, further, the signal transmission apparatus in this embodiment may further include:

a frequency resource determining module 14, where the frequency resource determining module 14 is configured to determine a frequency resource of the channel, where correspondingly, the sending module 13 is specifically configured to send the signal by using the frequency resource and the transmission subframe of the channel.

Further, the channel may be a physical random access channel PRACH or a physical uplink shared channel PUSCH.

Further, if the channel is the PRACH, the frequency resource determining module 14 may be specifically configured to:

determine a frequency resource of the PRACH according to a physical resource block offset $n_{PRBoffset}^{RA}$ of the PRACH and the number of resource blocks corresponding to the PRACH; or determine a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

Further, the number of the resource blocks corresponding to the PRACH may be 1, 2, or 3, or may be n/12, where n is an integer less than 12.

Specifically, when the frequency resource determining module 14 is configured to determine the frequency resource of the PRACH according to the physical resource block offset $n_{PRBoffset}^{RA}$ of the PRACH and the number of the resource blocks corresponding to the PRACH, a minimum granularity of the number of the resource blocks corresponding to the PRACH is a resource block; therefore, the number of the resource blocks corresponding to the PRACH may be an integer, for example, 1, 2, or 3; and when the frequency resource determining module 14 is configured to determine the frequency resource of the PRACH according to the physical resource block offset $n_{PRBoffset}^{RA}$ of the PRACH, the number of the resource blocks corresponding to the PRACH, and the subcarrier offset $n_{Subcarrieroffset}^{RA}$ of the PRACH, the minimum granularity of the number of the resource blocks corresponding to the PRACH is a subcarrier; and one resource block includes 12 subcarriers; therefore, the number of the resource blocks corresponding to the PRACH may be n/12, for example, 1/12, 1/2, 1/4, or 5/12.

In the prior art, the number of the resource blocks corresponding to the PRACH generally is 6, and it can be seen that, the signal transmission apparatus in this embodiment can make the granularity of frequency resource allocation smaller when the terminal sends the signal, which is more flexible.

Further, if the channel is the PUSCH, the frequency resource determining module 14 may be specifically configured to:

determine a frequency resource of the PUSCH according to a resource block indication and a resource element set indication of the PUSCH.

Further, the resource element set indication of the PUSCH is used to determine a virtual subcarrier.

Figure 13:
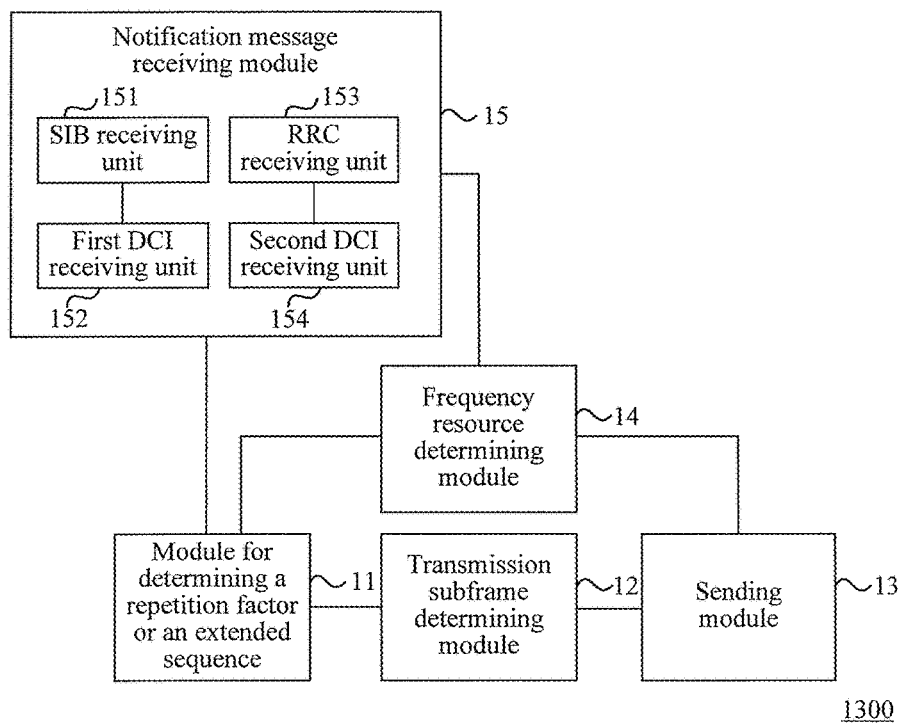
FIG. 13 is a schematic structural diagram of a third embodiment of a signal transmission apparatus according to the present invention.

FIG. 13 is a schematic structural diagram of a third embodiment of a signal transmission apparatus according to the present invention. The apparatus 1300 in this embodiment may be integrated on a terminal device, and is configured to execute the technical solutions in the foregoing method embodiments that are executed by a corresponding terminal. As shown in FIG. 13, based on the foregoing apparatuses, further, the signal transmission apparatus in this embodiment may further include: a notification message receiving module 15, where the notification message receiving module 15 may be configured to receive a notification message sent by a base station, where the notification message includes the repetition factor of the channel, and the module for determining a repetition factor or an extended sequence 11 may be specifically configured to obtain the repetition factor of the channel included in the notification message, and determine a repetition factor; or the notification message receiving module 15 may be configured to receive a notification message sent by a base station, where the notification message includes an extended sequence identifier, and the module for determining a repetition factor or an extended sequence 11 may be specifically configured to determine an extended sequence according to the extended sequence identifier.

Further, if the channel is the PRACH, the notification message may further include the physical resource block offset $n_{PRBoffset}^{RA}$ and the subcarrier offset $n_{Subcarrieroffset}^{RA}$ of the PRACH, so that the terminal determines the frequency resource of the PRACH according to the physical resource block offset $n_{PRBoffset}^{RA}$ and the subcarrier offset $n_{Subcarrieroffset}^{RA}$.

Further, if the channel is the PUSCH, the notification message may further include the resource block indication and the resource element set indication of the PUSCH, so that the terminal determines the frequency resource of the PUSCH according to the resource block indication and the resource element set indication of the PUSCH.

Further, the frequency resource of the channel included in the notification message may correspond to at least one repetition factor or at least one extended sequence identifier.

Further, if the channel is the PRACH, the notification message may be a system information block SIB message and/or a downlink control information DCI message.

Specifically, if the notification message is the SIB message, information of the frequency resource of the PRACH or a repetition factor or an extended sequence identifier of the PRACH may be located in a physical random access channel configuration information PRACH-ConfigInfo field of the SIB message or a physical random access channel machine type communication configuration information PRACH-ConfigInfoMTC field.

Alternatively, if the notification message is the DCI message, information of the frequency resource of the PRACH or a repetition factor or an extended sequence identifier of the PRACH may be located in an extended field of the DCI message, or a repetition factor or an extended sequence identifier of the PRACH may be indicated through joint coding with a preamble index of the PRACH.

Alternatively, the notification message may be the SIB message or the DCI message, and the notification message receiving module 15 may include: an SIB receiving unit 151 and a first DCI receiving unit 152, where the SIB receiving unit 151 may be configured to receive an SIB message, where the SIB message includes information of a group of frequency resources of the PRACH or a group of repetition factors of the PRACH or a group of extended sequence identifiers; and the first DCI receiving unit 152 may be configured to receive a DCI message, where the DCI message includes information of one frequency resource in the group of frequency resources of the PRACH or one repetition factor in the group of repetition factors of the PRACH or one extended sequence identifier in the group of extended sequence identifiers.

Further, alternatively, if the channel is the PUSCH, the notification message may be an RRC message or a DCI message.

Specifically, if the notification message is the RRC message, information of the frequency resource of the PUSCH or a repetition factor or an extended sequence identifier of the PUSCH may be located in a physical uplink shared channel configuration PUSCH-Config field of the RRC message or a physical uplink shared channel dedicated configuration PUSCH-ConfigDedicated field.

Alternatively, if the notification message is the DCI message, information of the frequency resource of the PUSCH or a repetition factor or an extended sequence identifier of the PUSCH may be located in an extended field of the DCI message, or the resource element set indication or a repetition factor or an extended sequence identifier of the PUSCH may be indicated through joint coding with resource block indication information of the PUSCH.

Alternatively, the notification message may be the RRC message or the DCI message, and the notification message receiving module 15 may include: an RRC receiving unit 153 and a second DCI receiving unit 154, where the RRC receiving unit 153 may be configured to receive an RRC message, where the RRC message includes information of a group of frequency resources of the PUSCH or repetition factors of the PUSCH or extended sequence identifiers; and the second DCI receiving unit 154 may be configured to receive a DCI message, where the DCI message includes information of one frequency resource in the information of the group of frequency resources of the PUSCH or one repetition factor in the group of repetition factors of the PUSCH or one extended sequence identifier in the group of extended sequence identifiers.

The apparatus in this embodiment may be configured to execute the technical solution of any one of the method embodiments in the present invention, has corresponding functional modules, and has similar implementation principles and technical effects, which are not repeated herein.

Figure 14:
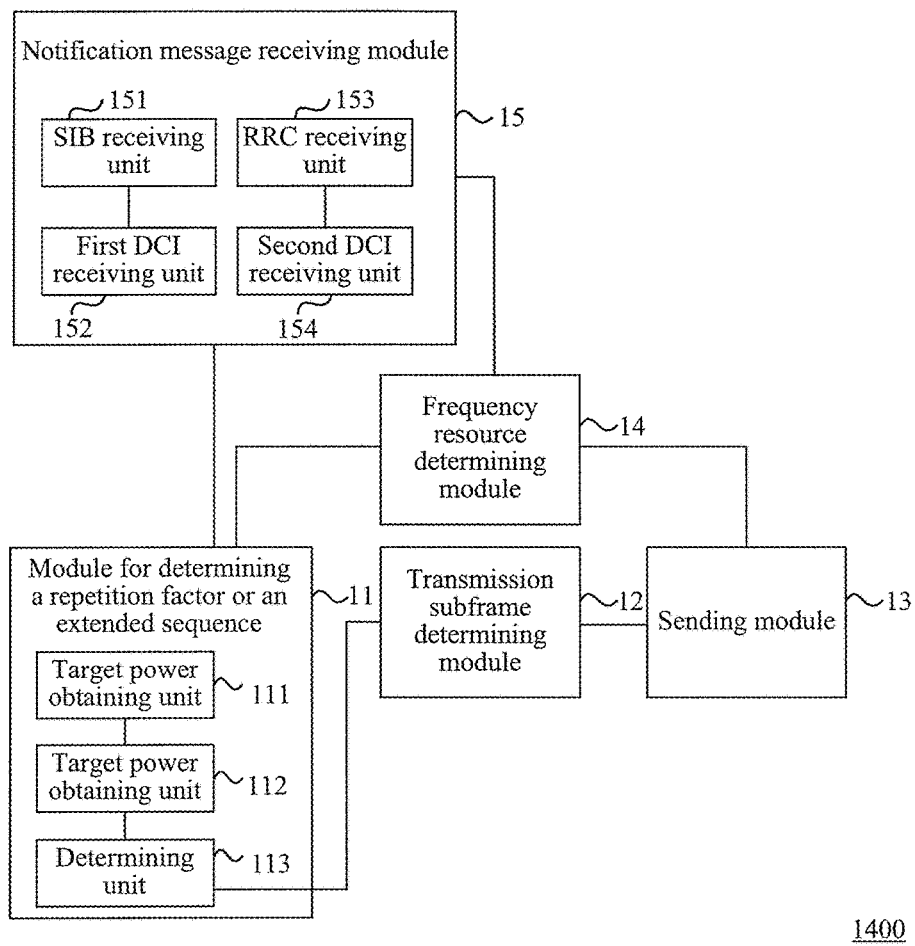
FIG. 14 is a schematic structural diagram of a fourth embodiment of a signal transmission apparatus according to the present invention.

FIG. 14 is a schematic structural diagram of a fourth embodiment of a signal transmission apparatus according to the present invention. The apparatus 1400 in this embodiment may be integrated on a terminal device, and is configured to execute the technical solutions in the foregoing method embodiments that are executed by a corresponding terminal. As shown in FIG. 14, based on the foregoing apparatuses, in the signal transmission apparatus in this embodiment, further, the module for determining a repetition factor or an extended sequence 11 may include: a target power obtaining unit 111, a judging unit 112, and a determining unit 113, where the target power obtaining unit 111 may be configured to receive a system message sent by the base station, where the system message includes target receive power of the channel;

the judging unit 112 may be configured to determine, according to maximum transmit power, a path loss, and the target receive power of the channel, whether the channel needs to be sent by using the repetition factor or the extended sequence; and the determining unit 113 may be configured to: if yes, determine the repetition factor of the channel; or determine the length of the extended sequence of the channel and determine the extended sequence corresponding to the length of the extended sequence.

Further, the determining unit may be specifically configured to:

according to the maximum transmit power, the path loss, and the target receive power of the channel, determine the repetition factor of the channel, or determine the length of the extended sequence of the channel and determine the extended sequence corresponding to the length of the extended sequence.

Further, the extended sequence may be Walsh Walsh sequence; or the extended sequence may be a sequence generated from a pseudo-noise PN sequence.

Further, the extended sequence being a sequence generated from a PN sequence may include that:

the extended sequence may be a sequence generated by using a cell identifier and/or a radio network temporary identifier of a cell in which the terminal is located as an initialization parameter of the PN sequence; or the extended sequence may be a sequence generated by using the extended sequence identifier, and a cell identifier and/or a radio network temporary identifier of a cell in which the terminal is located as initialization parameters of the PN sequence.

The apparatus in this embodiment may be configured to execute the technical solution of any one of the method embodiments in the present invention, has corresponding functional modules, and has similar implementation principles and technical effects, which are not repeated herein.

Figure 15A:
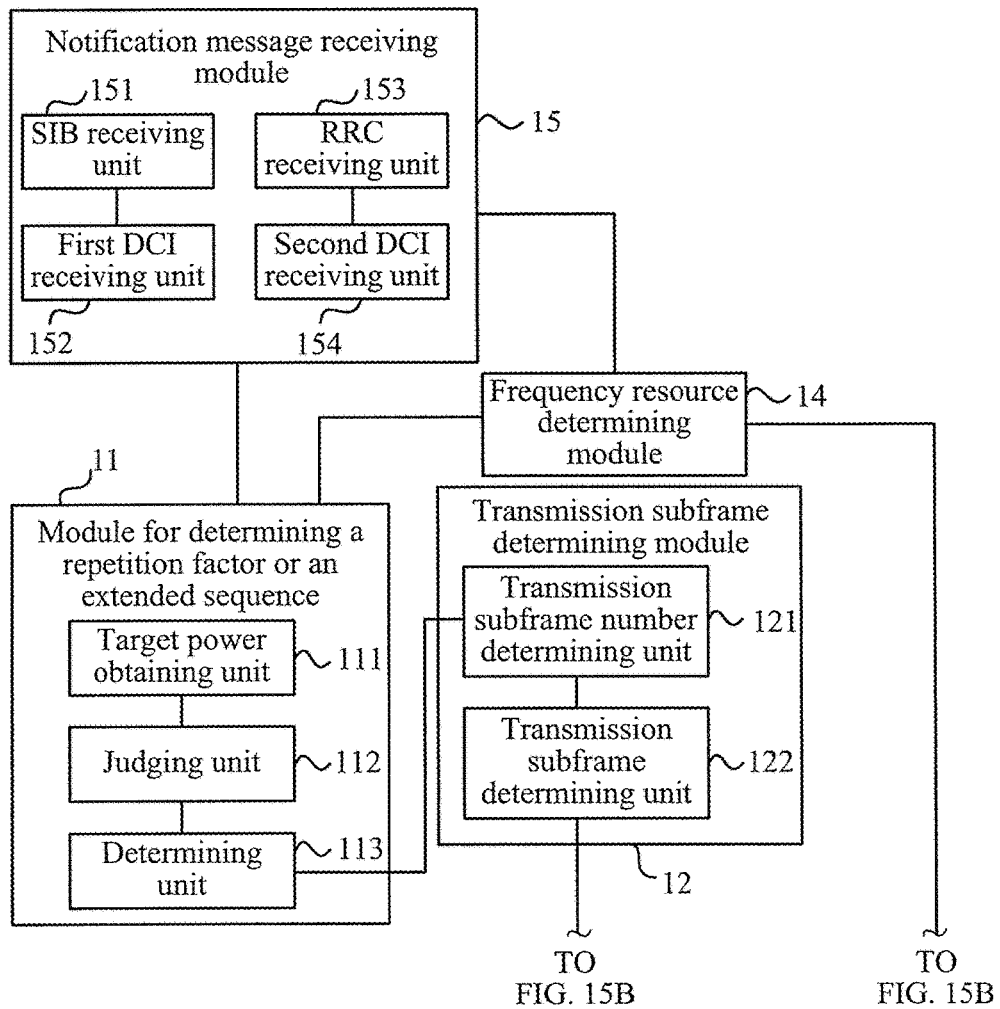
FIG. 15A and FIG. 15B are a schematic structural diagram of a fifth embodiment of a signal transmission apparatus according to the present invention.
Figure 15B:
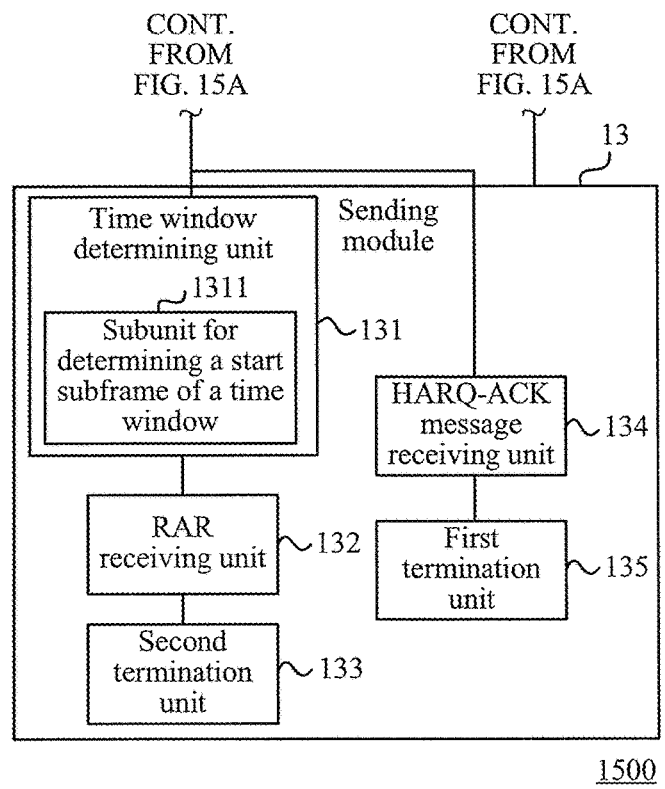

FIG. 15A and FIG. 15B are a schematic structural diagram of a fifth embodiment of a signal transmission apparatus according to the present invention. The apparatus 1500 in this embodiment may be integrated on a terminal device, and is configured to execute the technical solutions in the foregoing method embodiments that are executed by a corresponding terminal.

As shown in FIG. 15A and FIG. 15B, based on the foregoing apparatuses, in the signal transmission apparatus in this embodiment, further, the transmission subframe determining module 12 may include: a transmission subframe number determining unit 121 and a transmission subframe determining unit 122, where if the channel is the PUSCH, the transmission subframe number determining 121 may be configured to determine the number N of time domain resources according to the repetition factor or the length of the extended sequence, and according to a format of the PRACH; and the transmission subframe determining unit 122 may be configured to determine a transmission subframe according to a random access configuration index and the number N of transmission subframes.

Further, the transmission subframe determining unit 122 may be specifically configured to:

determine an available subframe number of the PRACH in a radio frame according to the random access configuration index; and cyclically use the available subframe number in at least one radio frame, and determine N corresponding subframes as transmission subframes, or use a subframe, which is in a radio frame and corresponds to any one of the available subframe numbers, as a start subframe, and select N consecutive subframes beginning from the start subframe as transmission subframes.

Further, the sending module 13 includes: a time window determining unit 131, an RAR receiving unit 132, and a second termination unit 133, where the time window determining unit 131 may be configured to determine a subframe number w of a start subframe of a time window and a length of the time window, where the start subframe w of the time window is before a subframe p2+3, and p2 is a subframe number of an end subframe in one PRACH transmission;

the RAR receiving unit 132 may be configured to receive, in a subframe with a subframe number being m2 in the time window, a random access response RAR sent by the base station; and the second termination unit 133 may be configured to terminate current transmission in a subframe m2+k2, where k2 is a preset integer.

Further, the time window determining unit 131 may include: a subunit for determining a start subframe of a time window 1311, where the subunit for determining a start subframe of a time window 1311 may be specifically configured to determine the start subframe w of the time window according to that w=p2−t1 or w=n2+t2, where t1 and t2 are preset integers, and n2 is a subframe number of a start subframe in one PRACH transmission.

Further, in order to support the PUSCH channel, the transmission subframe number determining unit 121 may be configured to determine the number N of transmission subframes according to the repetition factor or the length of the extended sequence, and according to a format of the PUSCH; and the transmission subframe determining unit 122 may be configured to use a transmission subframe of the original PUSCH as a start subframe m, and select N consecutive subframes beginning from the start subframe m as transmission subframes.

Further, the sending module 13 may include: an HARQ-ACK message receiving unit 134 and a first termination unit 135, where the HARQ-ACK message receiving unit 134 is configured to receive, in a subframe with a subframe number being m1, a DCI message or a hybrid automatic repeat request-acknowledgment HARQ-ACK message sent by the base station, where the subframe m1 is before a subframe p1+4, and p1 is a subframe number of an end subframe in one PUSCH transmission; and the first termination unit 135 is configured to: if the DCI message or the HARQ-ACK message indicates that the base station has successfully received a signal in current PUSCH transmission, terminate the current transmission in a subframe m1+k1, where k1 is a preset integer.

The apparatus in this embodiment may be configured to execute the technical solution of any one of the method embodiments in the present invention, has corresponding functional modules, and has similar implementation principles and technical effects, which are not repeated herein.

Figure 16:
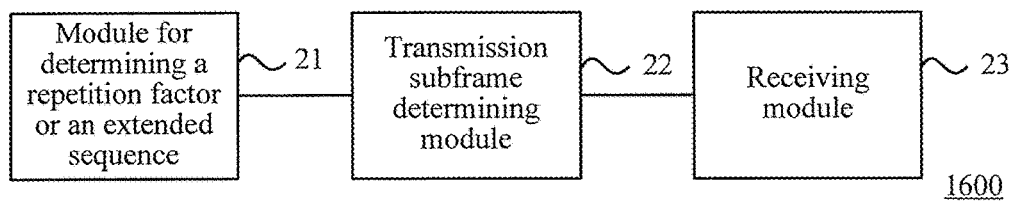
FIG. 16 is a schematic structural diagram of a sixth embodiment of a signal transmission apparatus according to the present invention.

FIG. 16 is a schematic structural diagram of a sixth embodiment of a signal transmission apparatus according to the present invention. The apparatus 1600 in this embodiment may be integrated on a base station, and is configured to execute the technical solutions in the foregoing method embodiments that are executed by a corresponding base station. As shown in FIG. 16, the signal transmission apparatus in this embodiment may include: a module for determining a repetition factor or an extended sequence 21, a transmission subframe determining module 22, and a receiving module 23, where the module for determining a repetition factor or an extended sequence 21 may be configured to determine a repetition factor or an extended sequence of a channel;

the transmission subframe determining module 22 may be configured to determine a time domain resource according to the repetition factor or a length of the extended sequence, where the time domain resource is a transmission subframe; and the receiving module 23 may be configured to receive a signal by using the transmission subframe of the channel.

The technical effects of the apparatus in this embodiment are as follows: The base station integrated with the signal transmission apparatus increases the number of transmission subframes of the channel by using the repetition factor or the extended sequence of the channel and according to the repetition factor or the length of the extended sequence, which prolongs receive time, thereby increasing receive energy of the channel and extending the coverage of the channel.

Figure 17:
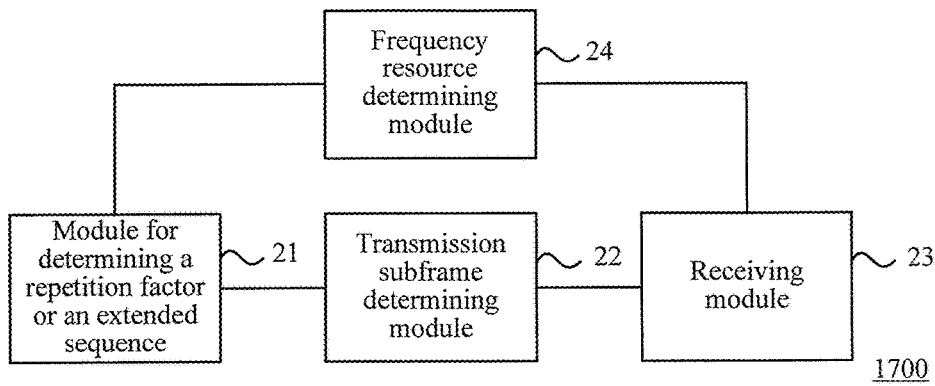
FIG. 17 is a schematic structural diagram of a seventh embodiment of a signal transmission apparatus according to the present invention.

FIG. 17 is a schematic structural diagram of a seventh embodiment of a signal transmission apparatus according to the present invention. The apparatus 1700 in this embodiment may be integrated on a base station, and is configured to execute the technical solutions in the foregoing method embodiments that are executed by a corresponding base station. As shown in FIG. 17, based on the apparatus shown in FIG. 16, further, the signal transmission apparatus in this embodiment may further include: a frequency resource determining module 24, where the frequency resource determining module 24 may be configured to determine a frequency resource of the channel, where correspondingly, the receiving module 23 may be specifically configured to receive the signal by using the frequency resource and the transmission subframe of the channel.

Further, the channel is a physical random access channel PRACH or a physical uplink shared channel PUSCH.

Further, if the channel is the PRACH, the frequency resource determining module 24 may be specifically configured to:

determine a frequency resource of the PRACH according to a physical resource block offset $n_{PRBoffset}^{RA}$ of the PRACH and the number of resource blocks corresponding to the PRACH; or determine a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

Further, the number of the resource blocks corresponding to the PRACH is 1, 2, or 3, or is n/12, where n is an integer less than 12.

Specifically, when the frequency resource determining module 24 is configured to determine the frequency resource of the PRACH according to the physical resource block offset $n_{PRBoffset}^{RA}$ of the PRACH and the number of the resource blocks corresponding to the PRACH, a minimum granularity of the number of the resource blocks corresponding to the PRACH is a resource block; therefore, the number of the resource blocks corresponding to the PRACH may be an integer, for example, 1, 2, or 3; and when the frequency resource determining module 14 is configured to determine the frequency resource of the PRACH according to the physical resource block offset $n_{PRBoffset}^{RA}$ of the PRACH, the number of vresource blocks corresponding to the PRACH, and the subcarrier offset $n_{Subcarrieroffset}^{RA}$ of the PRACH, the minimum granularity of the number of the resource blocks corresponding to the PRACH is a subcarrier; and one resource block includes 12 subcarriers; therefore, the number of the resource blocks corresponding to the PRACH may be n/12, for example, 1/12, 1/2, 1/4, or 5/12.

In the prior art, the number of the resource blocks corresponding to the PRACH generally is 6, and it can be seen that, the signal transmission apparatus in this embodiment can make the granularity of frequency resource allocation smaller during signal transmission, which is more flexible.

Further, if the channel is the PUSCH, the frequency resource determining module 24 may be specifically configured to:

determine a frequency resource of the PUSCH according to a resource block indication and a resource element set indication of the PUSCH.

Further, the resource element set indication of the PUSCH is used to determine a virtual subcarrier.

Figure 18:
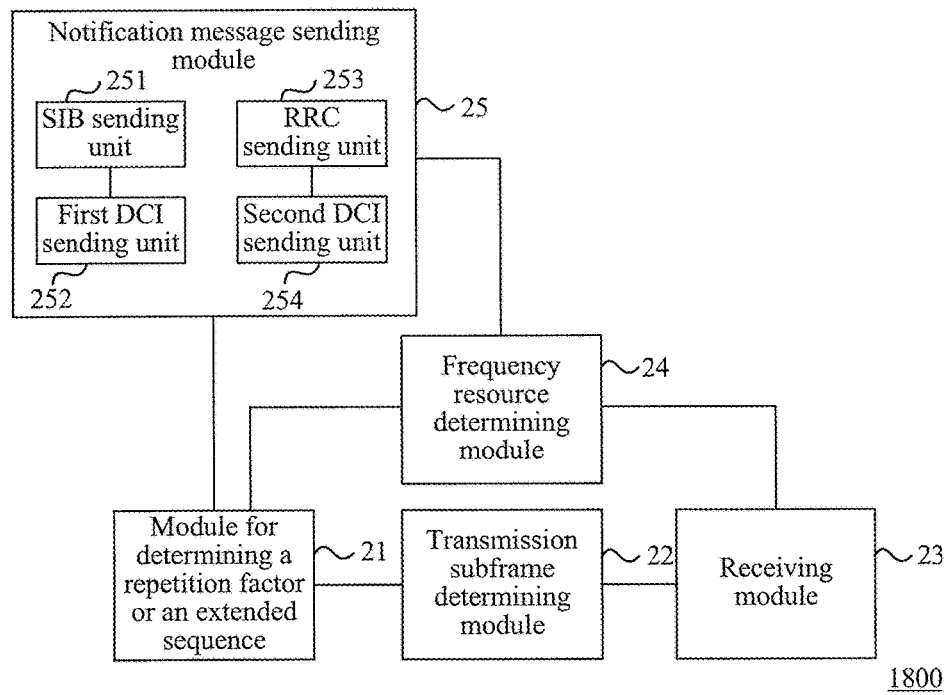
FIG. 18 is a schematic structural diagram of an eighth embodiment of a signal transmission apparatus according to the present invention.

FIG. 18 is a schematic structural diagram of an eighth embodiment of a signal transmission apparatus according to the present invention. The apparatus 1800 in this embodiment may be integrated on a base station, and is configured to execute the technical solutions in the foregoing method embodiments that are executed by a corresponding base station. As shown in FIG. 18, based on the foregoing apparatus shown in FIG. 17, further, the signal transmission apparatus in this embodiment may further include: a notification message sending module 25, where the notification message sending module 25 may be configured to send a notification message to the terminal, where the notification message includes the repetition factor or the extended sequence identifier of the channel, so as to instruct the terminal to determine, according to the notification message, the repetition factor or the extended sequence of the channel.

Further, if the channel is the PRACH, the notification message may further include the physical resource block offset $n_{PRBoffset}^{RA}$ of the PRACH and the subcarrier offset $n_{Subcarrieroffset}^{RA}$ of the PRACH, so that the terminal determines the frequency resource of the PRACH according to the notification message.

Further, if the channel is the PUSCH, the notification message may further include the resource block indication and the resource element set indication of the PUSCH, which are included in the notification message sent to the terminal, so that the terminal determines the frequency resource of the PUSCH according to the notification message.

Further, the frequency resource of the channel included in the notification message may correspond to at least one repetition factor or at least one extended sequence identifier.

Further, if the channel is the PRACH, the notification message is a system information block SIB message and/or a downlink control information DCI message.

Specifically, if the notification message is the SIB message, information of the frequency resource of the PRACH or a repetition factor or an extended sequence identifier of the PRACH may be located in a physical random access channel configuration information PRACH-ConfigInfo field of the SIB message or a physical random access channel machine type communication configuration information PRACH-ConfigInfoMTC field.

Alternatively, if the notification message is the DCI message, information of the frequency resource of the PRACH or a repetition factor or an extended sequence identifier of the PRACH is located in an extended field of the DCI message, or a repetition factor or an extended sequence identifier of the PRACH is indicated through joint coding with a preamble index of the PRACH.

Alternatively, the notification message may be the SIB message or the DCI message, and the notification message sending module 25 may include: an SIB sending unit 251 and a first DCI sending unit 252, where the SIB sending unit 251 may be configured to send an SIB message to the terminal, where the SIB message includes information of a group of frequency resources of the PRACH or a group of repetition factors of the PRACH or a group of extended sequence identifiers; and the first DCI sending unit 252 may be configured to send a DCI message to the terminal, where the DCI message includes information of one frequency resource in the information of the group of frequency resources of the PRACH or one repetition factor in the group of repetition factors of the PRACH or one extended sequence identifier in the group of extended sequence identifiers.

Further, alternatively, if the channel is the PUSCH, the notification message may be an RRC message or a DCI message.

Specifically, if the notification message is the RRC message, information of the frequency resource of the PUSCH or a repetition factor or an extended sequence identifier of the PUSCH is located in a physical uplink shared channel configuration PUSCH-Config field of the RRC message or a physical uplink shared channel dedicated configuration PUSCH-ConfigDedicated field.

Alternatively, if the notification message is the DCI message, information of the frequency resource of the PUSCH or a repetition factor or an extended sequence identifier of the PUSCH is located in an extended field of the DCI message, or the resource element set indication or a repetition factor or an extended sequence identifier of the PUSCH is indicated through joint coding with resource block indication information of the PUSCH.

Alternatively, the notification message may be the RRC message or the DCI message, and the notification message sending module 25 may include: an RRC sending unit 253 and a second DCI sending unit 254, where the RRC sending unit 253 may be configured to send an RRC message to the terminal, where the RRC message includes information of a group of frequency resources of the PUSCH or a group of repetition factors of the PUSCH or a group of extended sequence identifiers; and the second DCI sending unit 254 may be configured to send a DCI message to the terminal, where the DCI message includes information of one frequency resource in the information of the group of frequency resources of the PUSCH or one repetition factor in the group of repetition factors of the PUSCH or one extended sequence identifier in the group of extended sequence identifiers.

The apparatus in this embodiment may be configured to execute the technical solution of any one of the method embodiments in the present invention, has corresponding functional modules, and has similar implementation principles and technical effects, which are not repeated herein.

Figure 19:
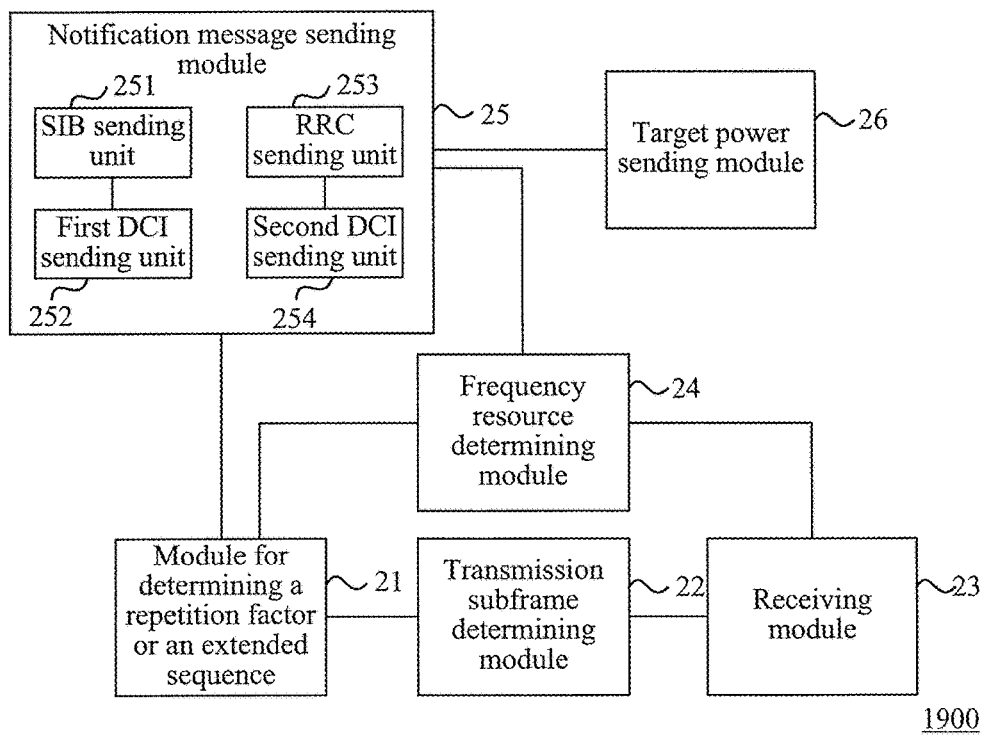
FIG. 19 is a schematic structural diagram of a ninth embodiment of a signal transmission apparatus according to the present invention.

FIG. 19 is a schematic structural diagram of a ninth embodiment of a signal transmission apparatus according to the present invention. The apparatus 1900 in this embodiment may be integrated on a base station, and is configured to execute the technical solutions in the foregoing method embodiments that are executed by a corresponding base station. As shown in FIG. 19, based on the foregoing apparatuses, further, the signal transmission apparatus in this embodiment may further include: a target power sending module 26, where the target power sending module 26 may be configured to send a system message to the terminal, where the system message includes target receive power of the channel, so that the terminal determines, according to maximum transmit power, a path loss, and the target receive power of the channel, whether the signal needs to be sent on the channel by using the repetition factor or the extended sequence.

Further, the system message further includes an available repetition factor, or further includes an extended sequence identifier of an available extended sequence, and the extended sequence and the extended sequence identifier correspond to the length of the extended sequence.

Further, a quantity of repetition factors or extended sequences of the channel may be at least two, and the transmission subframe determining module 22 may be specifically configured to determine transmission subframes corresponding to the at least two repetition factors or determine a length of each extended sequence and determine transmission subframes; and the receiving module 23 may be specifically configured to receive the signal in the transmission subframes corresponding to the at least two repetition factors of the channel or in the transmission subframes determined according to the lengths of the extended sequences.

Further, the extended sequence is a Walsh Walsh sequence, or the extended sequence is a sequence generated from a pseudo-noise PN sequence.

Further specifically, the extended sequence may be a sequence generated by using a cell identifier and/or a radio network temporary identifier of a cell in which the terminal is located as an initialization parameter of the PN sequence; or the extended sequence may be a sequence generated by using the extended sequence identifier, and a cell identifier and/or a radio network temporary identifier of a serving cell of the terminal as initialization parameters of the PN sequence.

The apparatus in this embodiment may be configured to execute the technical solution of any one of the method embodiments in the present invention, has corresponding functional modules, and has similar implementation principles and technical effects, which are not repeated herein.

Figure 20A:
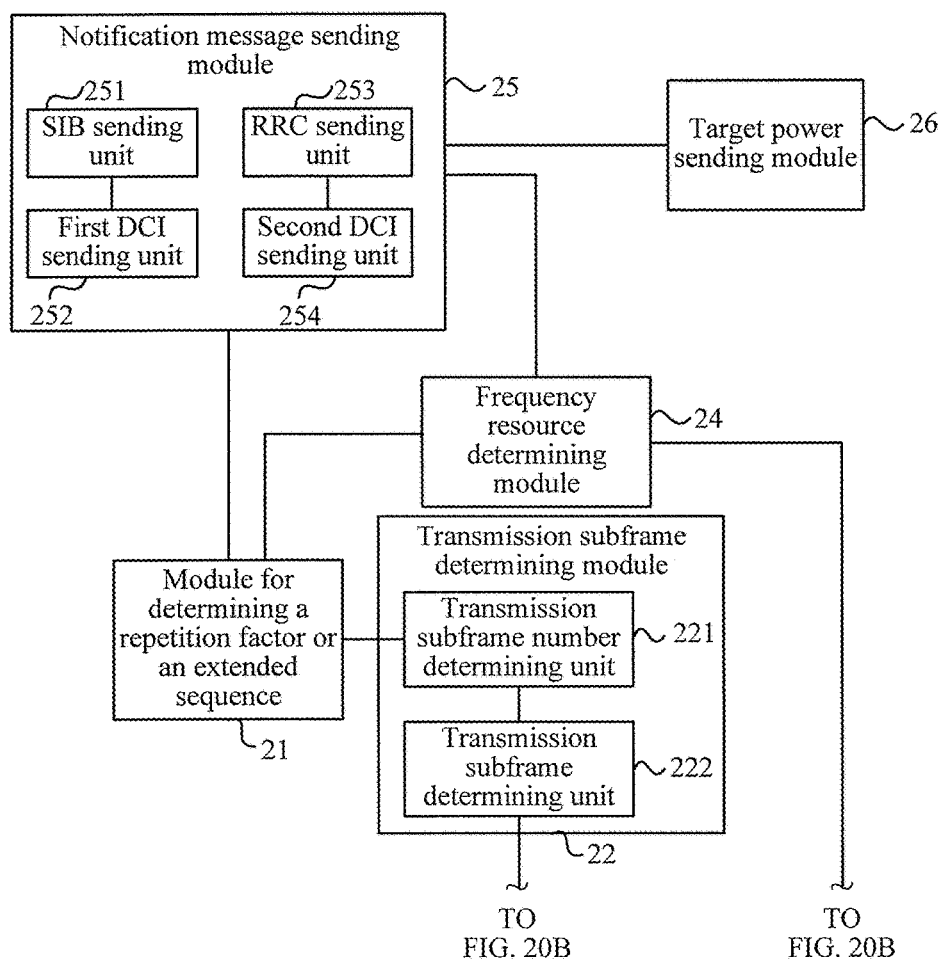
FIG. 20A and FIG. 20B are a schematic structural diagram of a tenth embodiment of a signal transmission apparatus according to the present invention.
Figure 20B:
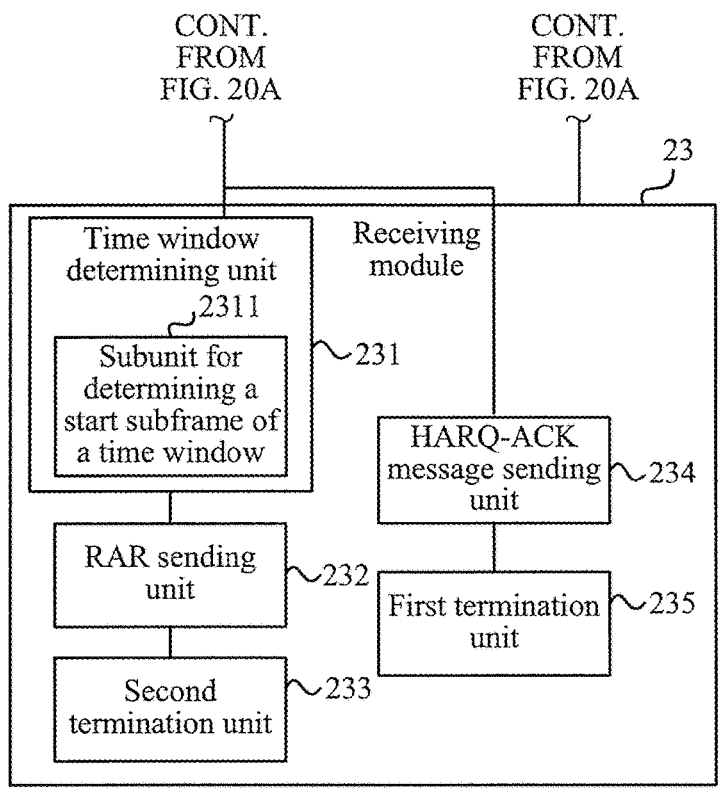

FIG. 20A and FIG. 20B are a schematic structural diagram of a tenth embodiment of a signal transmission apparatus according to the present invention. The apparatus 2000 in this embodiment may be integrated on a base station, and is configured to execute the technical solutions in the foregoing method embodiments that are executed by a corresponding base station. As shown in FIG. 20A and FIG. 20B, based on the foregoing apparatuses, in the signal transmission apparatus in this embodiment, further, the transmission subframe determining module 22 may include: a transmission subframe number unit 221, and a transmission subframe determining unit 222, where, in order to support the PRACH channel, the transmission subframe number unit 221 may be configured to determine the number N of transmission subframes according to the repetition factor or the length of the extended sequence, and according to a format of the PRACH; and the transmission subframe determining unit 222 may be configured to determine a transmission subframe according to a random access configuration index and the number N of transmission subframes.

Further, the transmission subframe determining unit 222 may be specifically configured to:

determine an available subframe number of the PRACH in a radio frame according to the random access configuration index; and cyclically use the available subframe number in at least one radio frame, and determine N corresponding subframes as transmission subframes, or use a subframe, which is in a radio frame and corresponds to any one of the available subframe numbers, as a start subframe, and select N consecutive subframes beginning from the start subframe as transmission subframes.

Further, the receiving module 23 may include: a time window determining unit 231, an RAR sending unit 232, and a second termination unit 233, where the time window determining unit 231 may be configured to determine a subframe number w of a start subframe of a time window and a length of the time window, where the start subframe w of the time window is before a subframe p2+3, and p2 is a subframe number of an end subframe in one PRACH transmission;

the RAR sending unit 232 may be configured to send, in a subframe with a subframe number being m2 in the time window, a random access response RAR to the terminal; and the second termination unit 233 may be configured to: in a subframe m2+k2, stop receiving a signal in current transmission, where k2 is a preset integer.

Further, the time window determining unit 231 may include: a subunit for determining a start subframe of a time window 2311, where the subunit for determining a start subframe of a time window 2311 may be specifically configured to determine the start subframe w of the time window according to that w=p−t1 or w=n+t2, where t1 and t2 are preset integers, and n2 is a subframe number of a start subframe in one PRACH transmission.

Further, in order to support the PUSCH channel, the transmission subframe number unit 221 may be configured to determine the number N of transmission subframes according to the repetition factor or the length of the extended sequence, and according to a format of the PUSCH; and the transmission subframe determining unit 222 may be configured to use a transmission subframe of the original PUSCH as a start subframe, and select N consecutive subframes beginning from the start subframe as transmission subframes.

Further, the receiving module 23 may include: an HARQ-ACK message sending unit 234 and a first termination unit 235, where the HARQ-ACK message sending unit 234 is configured to send, in a subframe with a subframe number being m1, a DCI message or a hybrid automatic repeat request-acknowledgment HARQ-ACK message to the terminal, where the DCI message or the HARQ-ACK message indicates that the base station has successfully received a signal in current PUSCH transmission, the subframe m1 is before a subframe p1+4, and p1 is a subframe number of an end subframe in one PUSCH transmission; and the first termination unit 235 is configured to: in a subframe m1+k1, stop receiving a signal in current transmission, where a subframe m is before a subframe p+4, and k1 is a preset integer.

Figure 21:
FIG. 21 is a schematic structural diagram of an embodiment of a communications system according to the present invention.

FIG. 21 is a schematic structural diagram of an embodiment of a communications system according to the present invention. As shown in FIG. 21, the communications system 2100 in this embodiment may include: at least one terminal and one base station, where the terminal may include the apparatus in any one of the embodiments of the signal transmission apparatus shown in FIG. 11 to FIG. 15A and FIG. 15B, can correspondingly execute the technical solution in any one of the method embodiments that are executed by a corresponding terminal, and has similar implementation principles and technical effects, which are not repeated herein; and the base station may include the apparatus in any one of the apparatus embodiments shown in FIG. 16 to FIG. 20A and FIG. 20B, can correspondingly execute the technical solution in any one of the method embodiments that are executed by a corresponding base station, and has similar implementation principles and technical effects, which are not repeated herein.

Figure 22:
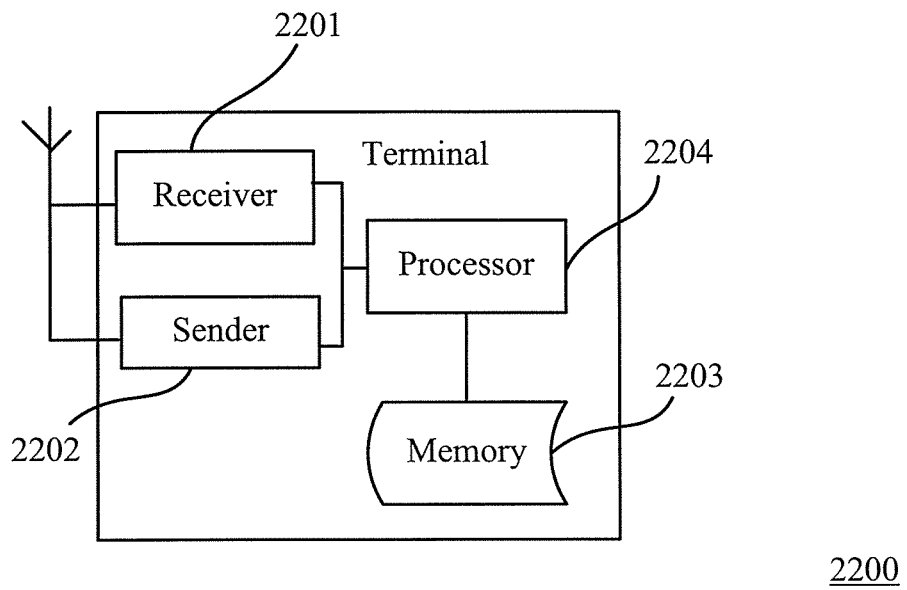
FIG. 22 is a schematic structural diagram of an embodiment of a terminal according to the present invention.

FIG. 22 is a schematic structural diagram of an embodiment of a terminal according to the present invention. As shown in FIG. 22, the terminal 2200 in this embodiment may include: a receiver 2201, a sender 2202, a memory 2203, and a processor 2204, where the memory 2203 is configured to store an instruction;

the processor 2204 is coupled with the memory 2203, the processor 2204 is configured to execute the instruction stored in the memory 2203, and the processor 2204 is configured to execute the technical solution in any one of the embodiments of the signal transmission method that are executed by a corresponding terminal;

the receiver 2201 is configured to receive, according to an instruction of the processor 2204, a notification message, a system message, or the like sent by a base station; and the sender 2202 is configured to send a signal to the base station according to the instruction of the processor 2204.

Figure 23:
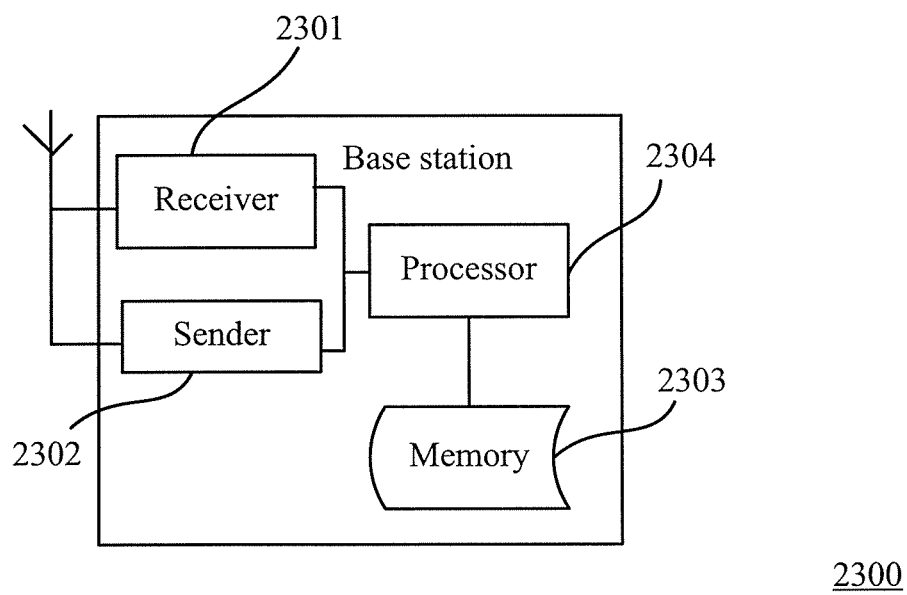
FIG. 23 is a schematic structural diagram of an embodiment of a base station according to the present invention.

FIG. 23 is a schematic structural diagram of an embodiment of a base station according to the present invention. As shown in FIG. 23, the base station 2300 in this embodiment may include: a receiver 2301, a sender 2302, a memory 2303, and a processor 2304, where the memory 2303 is configured to store an instruction;

the processor 2304 is coupled with the memory 2303, the processor 2304 is configured to execute the instruction stored in the memory 2303, and the processor 2304 is configured to execute the technical solution in any one of the embodiments of the signal transmission method executed by a corresponding terminal;

the receiver 2301 is configured to receive, according to the instruction of the processor 2304, a signal sent by the terminal; and the sender 2302 is configured to send a notification message, a system message, or the like to the terminal according to the instruction of the processor 2304.

The apparatus in this embodiment may be configured to execute the technical solution of any one of the method embodiments in the present invention, has corresponding functional modules, and has similar implementation principles and technical effects, which are not repeated herein.

Persons of ordinary skill in the art may understand that all or a part of the steps of the method embodiments may be implemented by a program instructing relevant hardware. The program may be stored in a computer readable storage medium. When the program runs, the steps of the method embodiments are executed. The foregoing storage medium includes: any medium that can store program code, such as a ROM, a RAM, a magnetic disk, or an optical disc.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as these modifications or replacements do not cause the essence of corresponding technical solutions to depart from the scope of the technical solutions of the embodiments of the present invention.

What is claimed is:

1. A signal transmission method, comprising:
   determining a repetition factor or an extended sequence of a channel;
   determining a time domain resource according to the repetition factor or a length of the extended sequence, wherein the time domain resource is a transmission subframe;
   sending a signal by using the transmission subframe;
   wherein the repetition factor is a multiple by which a number of transmission subframes of the channel transmitted in the signal is increased relative to the number of transmission subframes in a preamble format originally transmitted; and
   wherein the extended sequence is a sequence of signed numerical values, and for each signed numerical value in the sequence, the signal is transmitted with an amplitude weighted according to the numerical value relative to a preamble format originally transmitted and with a phase of same phase as the preamble format if the numerical value is positive and with a phase of opposite phase as the preamble format if the numerical value is negative.

2. The method according to claim 1, wherein:
   before determining a repetition factor or an extended sequence of a channel, the method further comprises:
   determining a frequency resource of the channel; and
   sending a signal by using the transmission subframe of the channel comprises:
   sending the signal by using the frequency resource and the transmission subframe of the channel.

3. The method according to claim 1, wherein the channel is a physical random access channel (PRACH) or a physical uplink shared channel (PUSCH).

4. The method according to claim 3, wherein if the channel is a PRACH, determining a frequency resource of the channel comprises:
   determining a frequency resource of the PRACH according to a physical resource block offset $n_{PRBoffset}^{RA}$ of the PRACH and the number of resource blocks corresponding to the PRACH; or
   determining a frequency resource of the PRACH according to a physical resource block offset $n_{PRBoffset}^{RA}$ of the PRACH, the number of resource blocks corresponding to the PRACH, and a subcarrier offset $n_{Subcarrieroffset}^{RA}$ of the PRACH.

5. The method according to claim 1, wherein before determining a repetition factor or an extended sequence of a channel, the method further comprises:
   receiving a notification message sent by a base station, wherein the notification message comprises the repetition factor of the channel, and determining a repetition factor of a channel comprises: obtaining the repetition factor of the channel comprised in the notification message, and determining a repetition factor; or
   receiving a notification message sent by a base station, wherein the notification message comprises an extended sequence identifier, and determining an extended sequence of a channel comprises: obtaining the extended sequence identifier comprised in the notification message, and determining an extended sequence according to the extended sequence identifier.

6. The method according to claim 5, wherein the channel is a physical random access channel (PRACH), and the notification message further comprises the physical resource block offset $n_{PRBoffset}^{RA}$ and the subcarrier offset $n_{Subcarrieroffset}^{RA}$ of the PRACH.

7. The method according to claim 5, wherein the channel is a physical uplink shared channel (PUSCH), and the notification message further comprises the resource block indication and the resource element set indication of the PUSCH.

8. The method according to claim 5, wherein the frequency resource of the channel comprised in the notification message corresponds to at least one repetition factor or at least one extended sequence identifier.

9. The method according to claim 5, wherein if the channel is a physical random access channel (PRACH), the notification message is a system information block (SIB) message and/or a downlink control information (DCI) message.

10. The method according to claim 1, wherein if the channel is a physical random access channel (PRACH), determining a time domain resource according to the repetition factor or a length of the extended sequence, wherein the time domain resource is a transmission subframe comprises:
    determining the number N of transmission subframes according to the repetition factor or the length of the extended sequence, and according to a format of the PRACH; and
    determining a transmission subframe according to a random access configuration index and the number N of transmission subframes.

11. The method according to claim 1, wherein if the channel is a physical uplink shared channel (PUSCH), determining a time domain resource according to the repetition factor or a length of the extended sequence comprises:
    determining the number N of transmission subframes according to the repetition factor or the length of the extended sequence, and according to a format of the PUSCH; and
    using a transmission subframe of the original PUSCH as a start subframe m, and selecting N consecutive subframes beginning from the start subframe m as transmission subframes.

12. A signal transmission method, comprising:
    determining a repetition factor or an extended sequence of a channel;
    determining a time domain resource according to the repetition factor or a length of the extended sequence, wherein the time domain resource is a transmission subframe;
    sending a signal by using the transmission subframe;
    wherein before determining a repetition factor or an extended sequence of a channel, the method further comprises:

receiving a notification message sent by a base station, wherein the notification message comprises the repetition factor of the channel, and determining a repetition factor of a channel comprises: obtaining the repetition factor of the channel comprised in the notification message, and determining a repetition factor, or receiving a notification message sent by a base station, wherein the notification message comprises an extended sequence identifier, and determining an extended sequence of a channel comprises: obtaining the extended sequence identifier comprised in the notification message, and determining an extended sequence according to the extended sequence identifier;

wherein when the channel is a physical random access channel (PRACH), the notification message is a system information block (SIB) message and/or a downlink control information (DCI) message; and wherein when the notification message is a SIB message, information of the frequency resource of the PRACH or a repetition factor or an extended sequence identifier of the PRACH is located in a physical random access channel configuration information (PRACH-ConfigInfo) field of the SIB message or a physical random access channel machine type communication configuration information (PRACH-ConfigInfoMTC) field.

13. A signal transmission method, comprising:
determining a repetition factor or an extended sequence of a channel;
determining a time domain resource according to the repetition factor or a length of the extended sequence, wherein the time domain resource is a transmission subframe;
sending a signal by using the transmission subframe;
wherein before determining a repetition factor or an extended sequence of a channel, the method further comprises:
    receiving a notification message sent by a base station, wherein the notification message comprises the repetition factor of the channel, and determining a repetition factor of a channel comprises: obtaining the repetition factor of the channel comprised in the notification message, and determining a repetition factor, or
    receiving a notification message sent by a base station, wherein the notification message comprises an extended sequence identifier, and determining an extended sequence of a channel comprises: obtaining the extended sequence identifier comprised in the notification message, and determining an extended sequence according to the extended sequence identifier; and
wherein receiving a notification message sent by a base station comprises:
    receiving a system information block (SIB) comprising information of a group of frequency resources of a physical random access channel (PRACH), a group of repetition factors of the PRACH or a group of extended sequence identifiers; and
    receiving a downlink control information (DCI) message comprising information of one frequency resource in the group of frequency resources of the PRACH or one repetition factor in the group of repetition factors of the PRACH or one extended sequence identifier in the group of extended sequence identifiers.

14. A signal transmission method, comprising:
determining a repetition factor or an extended sequence of a channel;
determining a time domain resource according to the repetition factor or a length of the extended sequence, wherein the time domain resource is a transmission subframe;
sending a signal by using the transmission subframe; and
wherein determining a repetition factor or an extended sequence of a channel comprises:
    receiving a system message sent by the base station, wherein the system message comprises target receive power of the channel,
    determining, according to maximum transmit power, a path loss, and the target receive power of the channel, and whether the channel needs to be sent by using the repetition factor or the extended sequence, and
    when the channel needs to be sent, determining the repetition factor of the channel, or determining the length of the extended sequence of the channel and determining the extended sequence corresponding to the length of the extended sequence.

15. The method according to claim 14, wherein determining the repetition factor of the channel, or determining the length of the extended sequence of the channel and determining the extended sequence corresponding to the length of the extended sequence comprises:
    according to the maximum transmit power, the path loss, and the target receive power of the channel, determining the repetition factor of the channel, or determining the length of the extended sequence of the channel and determining the extended sequence corresponding to the length of the extended sequence.

16. A signal transmission method, comprising:
determining a repetition factor or an extended sequence of a channel;
determining a time domain resource according to the repetition factor or a length of the extended sequence, wherein the time domain resource is a transmission subframe;
sending a signal by using the transmission subframe;
wherein when the channel is a physical random access channel (PRACH), determining a time domain resource according to the repetition factor or a length of the extended sequence comprises:
    determining the number N of transmission subframes according to the repetition factor or the length of the extended sequence, and according to a format of the PRACH, and
    determining a transmission subframe according to a random access configuration index and the number N of transmission subframes; and
wherein determining a transmission subframe according to a random access configuration index and the number N of transmission subframes comprises:
    determining an available subframe number of the PRACH in a radio frame according to the random access configuration index, and
    cyclically using the available subframe number in at least one radio frame, and determining N corresponding subframes as transmission subframes, or using a subframe, which is in a radio frame and corresponds to any one of the available subframe numbers, as a start subframe, and selecting N consecutive subframes beginning from the start subframe as transmission subframes.

17. A signal transmission method, comprising:
determining a repetition factor or an extended sequence of a channel;
determining a time domain resource according to the repetition factor or a length of the extended sequence, wherein the time domain resource is a transmission subframe;
sending a signal by using the transmission subframe;
wherein when the channel is a physical uplink shared channel (PUSCH), sending a signal by using the transmission subframe of the channel comprises:
receiving, in a subframe with a subframe number being m1, a downlink control information (DCI) message or a hybrid automatic repeat request-acknowledgment (HARQ-ACK) message sent by the base station, wherein the subframe m1 is before a subframe p1+4, and p1 is a subframe number of an end subframe in one PUSCH transmission, and
when the DCI message or the HARQ-ACK message indicates that the base station has successfully received a signal in current PUSCH transmission, terminating the current transmission in a subframe m1+k1, wherein k1 is a preset integer.

18. A signal transmission method, comprising:
determining a repetition factor or an extended sequence of a channel;
determining a time domain resource according to the repetition factor or a length of the extended sequence, wherein the time domain resource is a transmission subframe;
sending a signal by using the transmission subframe;
wherein when the channel is a physical random access channel (PRACH), sending a signal by using the transmission subframe of the channel comprises:
determining a subframe number w of a start subframe of a time window and a length of the time window, wherein the start subframe w of the time window is before a subframe p2+3, and p2 is a subframe number of an end subframe in one PRACH transmission,
receiving, in a subframe with a subframe number being m2 in the time window, a random access response (RAR) sent by the base station, and
terminating current transmission in a subframe m2+k2, wherein k2 is a preset integer.

19. The method according to claim 18, wherein determining a subframe number w of a start subframe of a time window comprises:
determining the start subframe w of the time window according to that w=p2−t1 or w=n2+t2, wherein t1 and t2 are preset integers, and n2 is a subframe number of a start subframe in one PRACH transmission.

20. A signal transmission apparatus, comprising:
a transmitter, a memory and a processor;
the memory being configured to store an instruction;
the processor being coupled with the memory and configured to execute the instruction stored in the memory;
the processor being further configured to determine a repetition factor or an extended sequence of a channel;
the processor being further configured to determine a time domain resource according to the repetition factor or a length of the extended sequence, wherein the time domain resource is a transmission subframe;
the transmitter being configured to send a signal according to the instruction of the processor by using the transmission subframe of the channel;
wherein the repetition factor is a multiple by which a number of transmission subframes of the channel transmitted in the signal is increased relative to the number of transmission subframes in a preamble format originally transmitted; and
wherein the extended sequence is a sequence of signed numerical values, and for each signed numerical value in the sequence, the signal is transmitted with an amplitude weighted according to the numerical value relative to a preamble format originally transmitted and with a phase of same phase as the preamble format if the numerical value is positive and with a phase of opposite phase as the preamble format if the numerical value is negative.

21. A signal receiving apparatus, comprising:
a receiver, a memory and a processor;
the memory being configured to store an instruction;
the processor being coupled with the memory and configured to execute the instruction stored in the memory;
the processor being further configured to determine a repetition factor or an extended sequence of a channel;
the processor being further configured to determine a time domain resource according to the repetition factor or a length of the extended sequence, wherein the time domain resource is a transmission subframe;
the receiver being configured to receive a signal according to the instruction of the processor by using the transmission subframe of the channel;
wherein the repetition factor is a multiple by which a number of transmission subframes of the channel transmitted in the signal is increased relative to the number of transmission subframes in a preamble format originally transmitted; and
wherein the extended sequence is a sequence of signed numerical values, and for each signed numerical value in the sequence, the signal is transmitted with an amplitude weighted according to the numerical value relative to a preamble format originally transmitted and with a phase of same phase as the preamble format if the numerical value is positive and with a phase of opposite phase as the preamble format if the numerical value is negative.

* * * * *